United States Patent [19]

Staiger et al.

[11] Patent Number: 5,065,287

[45] Date of Patent: Nov. 12, 1991

[54] METHOD OF PRODUCING AN OPTICALLY EFFECTIVE ARRANGEMENT, IN PARTICULAR FOR APPLICATION WITH A VEHICULAR HEADLIGHT

[75] Inventors: Ulrich Staiger, Stuttgart; Joseph Strobel, Winterbach, both of Fed. Rep. of Germany; Peter E. Castro, Rochester, N.Y.

[73] Assignee: Eastman Kodak Company, Rochester, N.Y.

[21] Appl. No.: 415,228

[22] PCT Filed: Mar. 11, 1988

[86] PCT No.: PCT/EP88/00196

§ 371 Date: Sep. 6, 1989

§ 102(e) Date: Sep. 6, 1989

[87] PCT Pub. No.: WO88/07155

PCT Pub. Date: Sep. 22, 1988

[30] Foreign Application Priority Data

Mar. 11, 1987 [DE] Fed. Rep. of Germany ....... 3707751

Apr. 25, 1987 [DE] Fed. Rep. of Germany ....... 3713867

[51] Int. Cl.[5] ............................................ B60Q 1/00

[52] U.S. Cl. ...................................... 362/61; 362/346; 362/348; 362/297

[58] Field of Search ................. 362/61, 296, 301, 308, 362/341, 347, 350, 298, 299, 346, 348, 297

[56] References Cited

U.S. PATENT DOCUMENTS

| | | | |
|---|---|---|---|
| 4,153,929 | 5/1979 | Laudenschlarger et al. | 362/348 |
| 4,481,563 | 11/1984 | Snyder et al. | 362/346 X |
| 4,495,552 | 1/1985 | Graff | 362/297 |
| 4,517,630 | 5/1985 | Dieffenbach et al. | 362/268 |
| 4,530,042 | 7/1985 | Cibie et al. | 362/309 |
| 4,612,608 | 9/1986 | Peitz | 362/346 X |
| 4,704,661 | 11/1987 | Kosmatke | 362/346 |
| 4,722,023 | 1/1988 | Arima et al. | 362/309 X |
| 4,740,871 | 4/1988 | Dilouya | 362/309 X |
| 4,825,343 | 4/1989 | Nakata | 362/346 |

FOREIGN PATENT DOCUMENTS

| | | | |
|---|---|---|---|
| 1802113 | 2/1976 | Fed. Rep. of Germany . | |
| 2608518 | 9/1976 | Fed. Rep. of Germany | 362/347 |
| 3341773 | 5/1984 | Fed. Rep. of Germany . | |
| 3334459 | 4/1985 | Fed. Rep. of Germany . | |
| 3340796 | 5/1985 | Fed. Rep. of Germany . | |

OTHER PUBLICATIONS

Computer Design of Automotive Lamp with Faceted Reflectors, Donohue and Joseph, Journal of the Iluminating Eng. Society, Oct. 1972, pp. 36–42.

*Primary Examiner*—Ira S. Lazarus
*Assistant Examiner*—D. M. Cox
*Attorney, Agent, or Firm*—Norman Rushefsky

[57] ABSTRACT

A vehicular headlight, in particular an automobile headlight, including a reflector (1) having a reflecting surface, is capable of illuminating a flat target surface to be illuminated with a desired light distribution by optimal utilization of the light source of the headlight. Therefore the optically effective surface of the headlight is characterized by point asymmetry in substantially all planes cutting said reflecting surface. This can be realized by using a method for producing said optical surface comprising the steps of: mathematically representing said surface by creating a spline from bivariate tensor product of polynomials; deriving mathematical data in computer input format from said mathematical representation; and inputting said data to a computer for controlling an apparatus by which the mathematical representation of said optical surface is reproduced in physical form. Such splines, in turn, are represented and subsequently altered, preferably either by the so-called Bezier method or by the so-called Basis-spline method.

7 Claims, 3 Drawing Sheets

Figure 1:
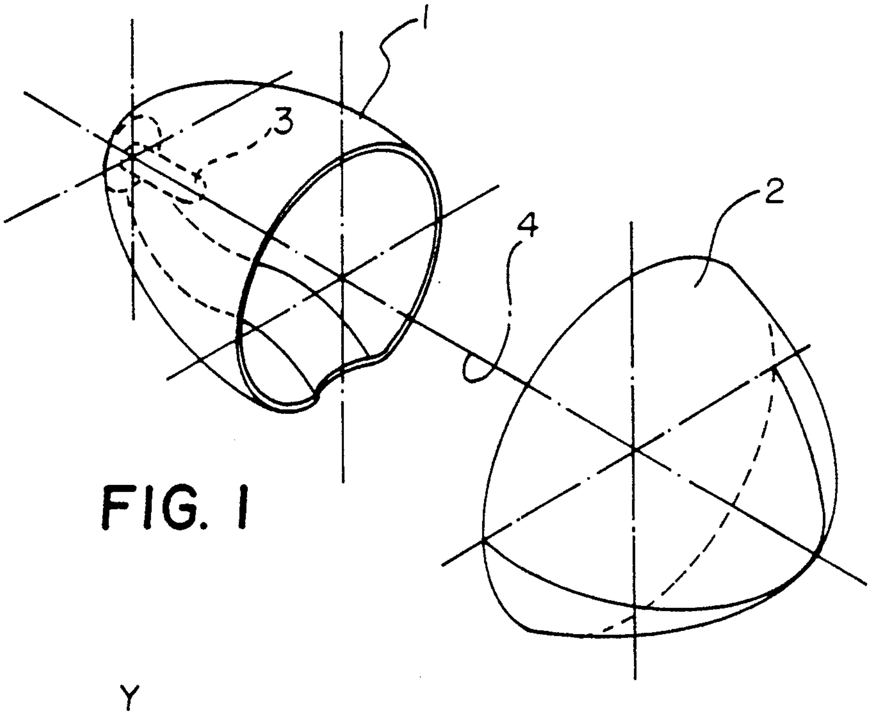

METHOD OF PRODUCING AN OPTICALLY EFFECTIVE ARRANGEMENT, IN PARTICULAR FOR APPLICATION WITH A VEHICULAR HEADLIGHT

The invention relates to a method for producing an optically effective arrangement comprising one reflective surface, said arrangement having a light source related to an optical axis which extends in alignment with the optical arrangement for distributing light of said light source reflected by said reflective surface according to a desired light pattern, in particular for application with a vehicular headlight.

Due to legal regulations directed to traffic safety, some known automobile headlights are provided with a masking element arranged in the beam of light between the reflector and a distributor lens in order to meet specific requirements with respect to illumination range, color uniformity, the illumination pattern on the roadway and its marginal area, and light/dark delimitation criteria.

The use of such masking elements, however, is one of the main reasons why such headlights mentioned can neither produce their full light output, nor are they free from the occurrence of color fringes, which runs counter to the requirement for emitting a uniformly colored light.

An automobile headlight is known from DE-AS 18 02 113 by means of which a sharp light/dark delimitation (low beam headlights) is to be achieved without the use of a masking element. For this purpose, the reflector comprises two narrow, axially symmetrical sectors forming the main mirror surface regions which effect the sharp light/dark delimitation. Two parabolic additional mirror surfaces supplement these surfaces. Thus, the known reflector consists of four individual surfaces adjoining at four boundary edges. Such boundary edges cause the reflected light to form irregular light beams directed at the surface to be illuminated, so that a continuous, i.e. smooth, light distribution of high intensity is impossible.

A reflector known from DE-OS 33 41 773 shows a similar structure. Also in this case, the object of distributing the light rays reflected by the reflector in their entirety below the light/dark delimitation, is attained incompletely and discontinuously. The known reflector also consists of two parabolic sectors which are arranged symmetrically around its horizontal axis and to which adjoin two pairs of so-called deflecting surfaces. Instead of four surfaces known from the reflector according to DE-AS 18 02 113, the reflector of DE-OS 33 41 773 comprises six surfaces which adjoin at six boundary edges and which, however, do not substantially improve the disadvantages of discontinuity of light distribution, even though the adjoining boundary edges of the individual reflector surfaces allegedly do not show discontinuities.

The article "Computer Design of Automotive Lamps With Faceted Reflectors", Donohue and Joseph, J. of I.E.S./1972, pp. 36–42 describes an automotive lamp in which the reflector is divided into segments (facets) in such a manner that the reflector alone produces the pattern and lens fluting is eliminated. The many facets, as shown in FIG. 12 of that article, have sharp edges and discontinuities between them. Since each facet is a paraboloidal surface, the intersections, or junctions between the surfaces necessarily are not smooth.

U.S. Pat. No. 4,495,552 discloses a reflector for a vehicle lamp, which consists of a plurality of grid sections. Each of the grid sections shows generally a concave shape both in horizontal and in vertical cross section.

It is the object of the invention to provide a headlight that illuminates a surface to be illuminated with a desired light distribution by optimal utilization of the light source of the headlight, particularly under the consideration of the legal regulations in several countries.

The above object is attained by a method for producing an optically effective arrangement comprising one reflective surface, said arrangement having a light source related to an optical axis which extends in alignment with the optical arrangement for distributing light of said light source reflected by said reflective surface according to a desired light pattern, said method is characterized by the steps of formulating an initial mathematical representation of at least a region of an approximated surface of said reflective surface, mathematically manipulating of said initial representation until the resulting mathematical surface representation achieves the desired optical properties, deriving from the resulting mathematical representation computer input data in computer input format, and inputting said data to a computer for controlling an apparatus by which the mathematical representation of said optical surface is reproduced in physical form.

The physical form can be a vehicular headlight produced by the above-mentioned method comprising an optically effective arrangement having one reflective surface, a light source related to an optical axis which extends in alignment with the optically effective arrangement. This vehicular headlight is characterized in that said reflective surface shows axial asymmetry over its entire axial length, said surface having a mathematically continuous shape such that the beam of light reflected by said reflective surface distributes the light of said light source according to the distribution of the light pattern desired by optimally utilizing the light emitted by the light source.

The optically effective arrangement may be represented by the reflector surface itself.

The optically effective arrangement may also be represented by the surface of an optical element arranged in the path of the light beam reflected by the reflector surface.

The optically effective arrangement may also be a combination of the reflector surface and a surface of the optical element in the path of the light beam reflected by the reflector surface.

The surface or surfaces of the optically effective arrangement according to the invention satisfy the following single mathematical formula:

$$X = \frac{\frac{\text{rho}^2}{R(\text{phi})}}{1 + \sqrt{1 - (K(\text{phi}) + 1) \cdot \frac{\text{rho}^2}{R(\text{phi})^2}}} + \sum_{n=0}^{n=ne} AK_n(\text{phi}) \cdot \text{rho}^n,$$

wherein

-continued $$R(\text{phi}) = \sum_{m=0}^{m=me} [Rc_m \cdot \cos(m \cdot \text{phi}) + Rs_m \cdot \sin(m \cdot \text{phi})],$$

$$K(\text{phi}) = \sum_{i=0}^{i=ie} [Kc_i \cdot \cos(i \cdot \text{phi}) + Ks_i \cdot \sin(i \cdot \text{phi})],$$

$$AK_n(\text{phi}) = \sum_{k=0}^{k=ke} [AKc_{nk} \cdot \cos(k \cdot \text{phi}) + AKs_{nk} \cdot \sin(k \cdot \text{phi})]$$

and wherein

- X represents a linear cylindrical coordinate of the headlight axis, which extends substantially in the direction of the light beam produced by the optically effective surface,
- rho is the radius vector of said cylindrical coordinates,
- phi represents the polar angle of said cylindrical coordinates of the loci,
- n represents integers from 0 through 50, preferably through 10,
- m, i and k represents integers from 0 through at least 3, preferably through 20,
- R(phi) represents a coefficient which depends on phi and defines the limit value of the radii of curvature of the conic part of the surface at the apex with axial planes extending through the headlight axis when X=0,
- K(phi) represents a conic section coefficient as a function of phi,
- $AK_n$(phi) represents one of ne+1 different aspheric coefficients as a function of phi,
- $Rc_m$ and $Rs_m$ each represent one of me+1, and
- $Kc_i$ and $Ks_i$ each represent one of ie+1 different constant parameters,
- $AKc_{nk}$ and $AKs_{nk}$ each represent one of (ne+1).-(ke+1) different constant parameters.

The above optical surface formula is a variation of a known formula for a surface of rotation having coefficients R, K, AKn which are independent of phi. In this known formula, each value of X produces a certain value of rho which is thus independent of phi. Due to the dependency of the above coefficients on phi in this representation, each value of X produces a value of rho which is dependent on phi. Thus, the radius vector rho is not only a function of X, as is the case in the known formula, but also a function of phi. The designations for K and AKn as "conic section coefficients" and "aspheric coefficients", respectively, result from the known formula which contains the coefficients independent of phi. In connection with the known surfaces of rotation, the designation "basic radius" for R is also commonly used.

The optically effective system of a headlight according to the above formula can be calculated in that for me and ie, preferably 20, values of each of the parameters $Rc_m$, $Rs_m$, $Kc_i$ and $Ks_i$ and for (ne+1).(ke+1) values of the parameters $AKc_{nk}$ and $AKs_{nk}$, wherein preferably ne=10 and ke+20, the radius of curvature coefficient R(phi), the conic section coefficient K(phi), and the aspheric coefficients $AK_n$(phi) are determined.

Because of the mutual dependency of the coefficients in the foregoing optical surface formula, mathematical manipulation of the representation of one particular region of the surface representation causes changes in other regions of the representation, which makes the overall mathematical process of arriving at desired surface representation very complex and time-consuming. Accordingly, a preferred method according to the invention for mathematically producing the desired optical surface includes the step of mathematically representing an approximation of that surface with mathematically represented surface segments in a manner that allows individual segments to be mathematically manipulated without influencing the optical properties of other regions of the representation. Preferably, such a manner of mathematical representation uses bivariate tensor product splines. Such splines, in turn, are represented and subsequently altered, preferably either by the so-called Bezier method or by the so-called B-spline method, starting with the determination of initial bivariate polynomials which describe surface segments and are equal at the common sides of adjacent surface segments through the second derivative (continuity at the common sides of the segments).

This can be realized by the determination of initial bivariate polynomials which describe surface segments of an approximate surface to a known optical surface, e.g. a paraboloid.

In a preferred realization of this method initial bivariate polynomials are determined describing initial surface segments having desired optical properties only of an initial region of the optically effective surface. Subsequent further bivariate polynomials are determined describing further initial surface segments located adjacent to the initial region until an approximate surface to the desired optically effective surface is achieved.

In both of said realizations, said approximate surfaces are, step by step, locally changed by varying the coefficients of the bivariate polynomials while retaining said continuity through the second derivatives without influencing optical properties of other regions of said approximate surface until the resulting representation of said optical surface achieves the desired optical properties.

Regardless of the method used to devise the mathematical representation of the desired optical surface in accordance with the invention, the resulting representation is then expressed in computer language and is used as the input to a computer that controls a machine tool to reproduce the mathematical surface representation in physical form.

Due to the asymmetry of the plurality of sections intersecting the reflector and/or the optical element, each reflective spot of the reflector illuminates a definite area on the surface to be illuminated, but a region of the illuminated surface may be illuminated from more than one reflector spot, i.e., the shape of the reflector has been calculated and determined such that the light rays reflected by the reflective spots of the reflector distribute the available amount of light on the surface to be illuminated according to the brightness desired at the various spots so that an undesired brightness increase or decrease is avoided and optimal utilization of the available light source is achieved.

Consequently, light losses caused when the light beam is formed by means of the optically effective surface according to the invention are minimal, and the amount of light emitted by the light source can be fully utilized.

In addition, an improved lateral field illumination as well as a gradual, instead of an abrupt, light/dark delimination is achieved, which is desired with respect to road traffic safety. Furthermore, it is not necessary to dissipate heat developed at a masking element due to direct and indirect irradiation.

Generally, a reflective filter layer can be used expediently for heat removal from the reflector, particularly a reflector made of plastic material.

Similarly, a lens or other optical element in the light path from the reflector can be protected by a reflective filter layer on the reflector itself and/or by a cold mirror, preferably arranged at an inclined angle in front of the reflector opening. If, for example, such a cold mirror is arranged in front of the reflector at an angle of 45 degrees, the optical axis of the light beam reflected by the mirror surface will extend normal to the axis of the reflector so that an L-shaped configuration of the headlight is obtained, which fact considerably reduces the space required for installing such a system, such reduction is advantageous in an automobile. The optical means interposed in the light beam reflected by the cold mirror surface is then transilluminated only by the cold light and, as a result, can be manufactured of thermosensitive material. In this case, the axis of the headlight forms a right angle, the legs of which are the reflector axis and the optical axis of the optical element arranged in front of the reflector.

Because the headlight according to the invention does not require any of the usual diffusion screens, the automobile body designer is substantially free in shaping the headlight front glass.

A lens arranged in front of the reflector opening can either consist of a colored material or can be provided with a color filter coating to meet local requirements for coloring the light emitted by the reflector.

Surprisingly, tests conducted have shown that the optically effective surface according to the invention produces not only an optimal low beam light, but also creates an excellent high beam when using a double-filament lamp, especially because the high beam is not impaired by a masking element.

In summary, a headlight designed according to the invention avoids the use of masking elements and provides optimal utilization of the available light, achieves the desired light distribution with a considerable increase in total light output, and avoids the occurrence of color fringes.

Two embodiments of a headlight and the methods according to the invention will now be described with reference to the drawing and the accompanying tables.

Figure 2:
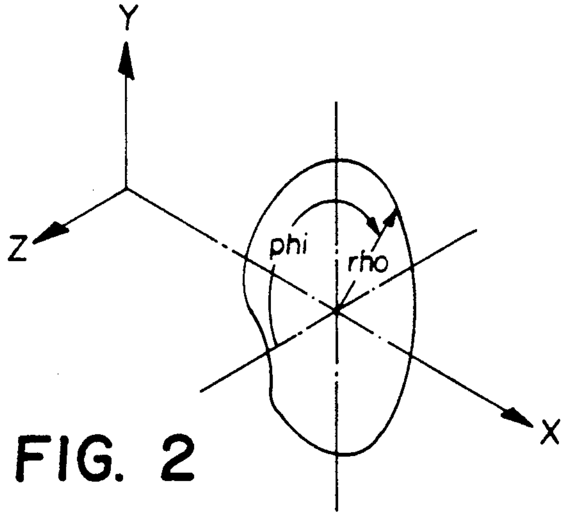

FIG. 1 shows a perspective view of a first embodiment of a headlight consisting of a reflector and a lens, FIG. 2 is a schematic perspective view of a cross-section (normal to the headlight axis) of the optically effective surface of a headlight within the coordinate system, X, Y and Z, showing cylindrical coordinates X, rho and phi, for the illustration of the first and second embodiments.

Figure 3A:
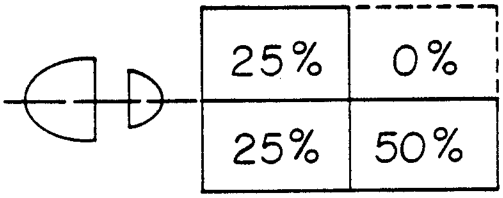
Figure 3B:
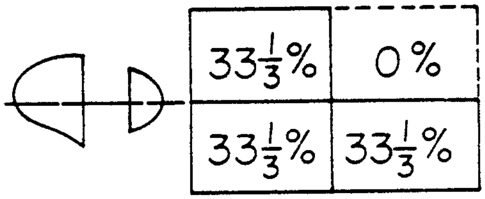
Figure 4:
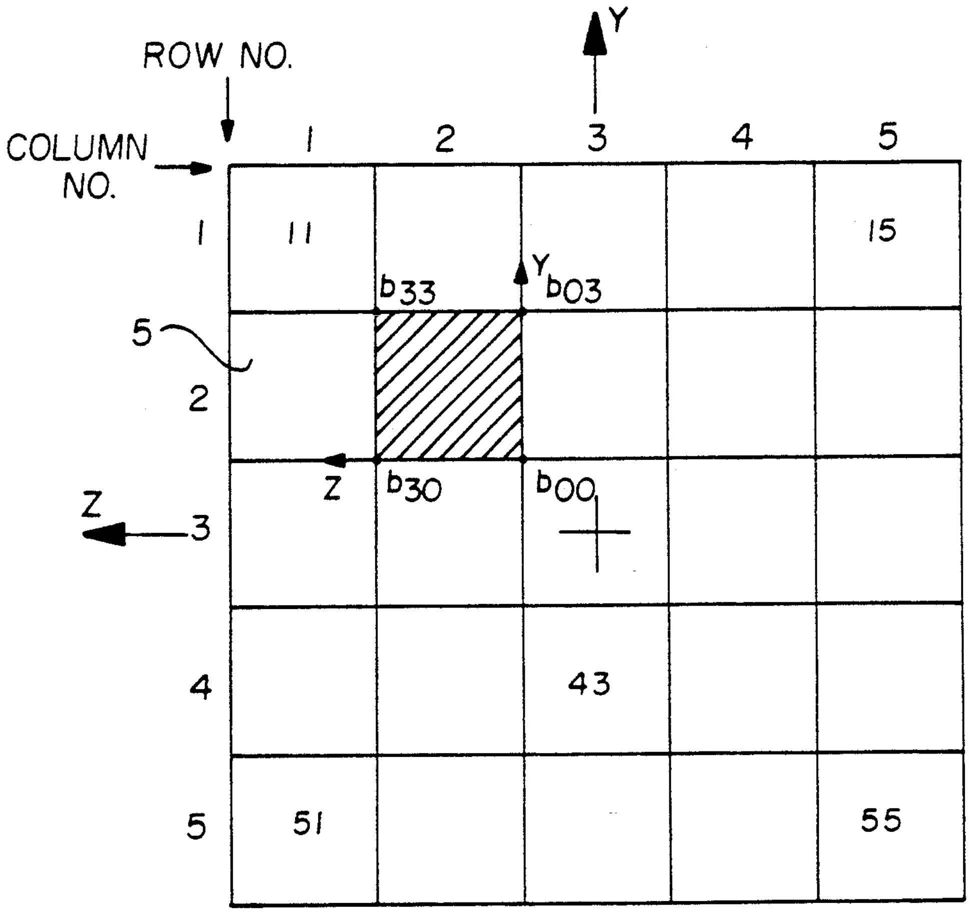
Figure 5:
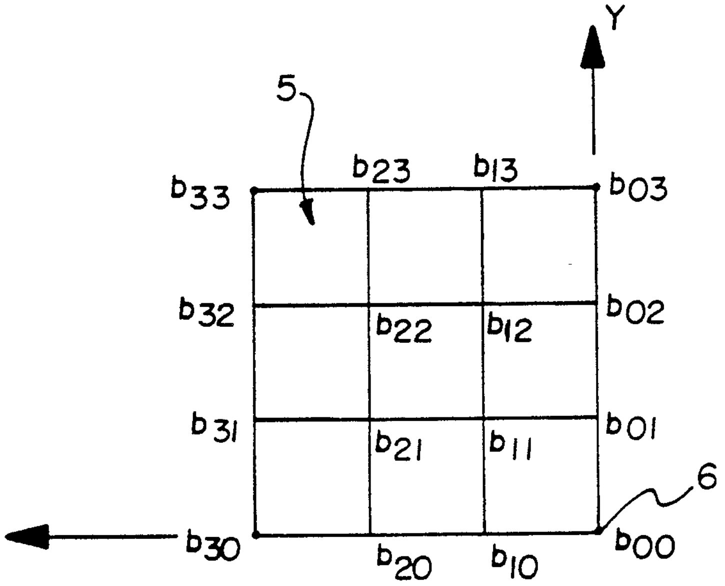
Figure 6:
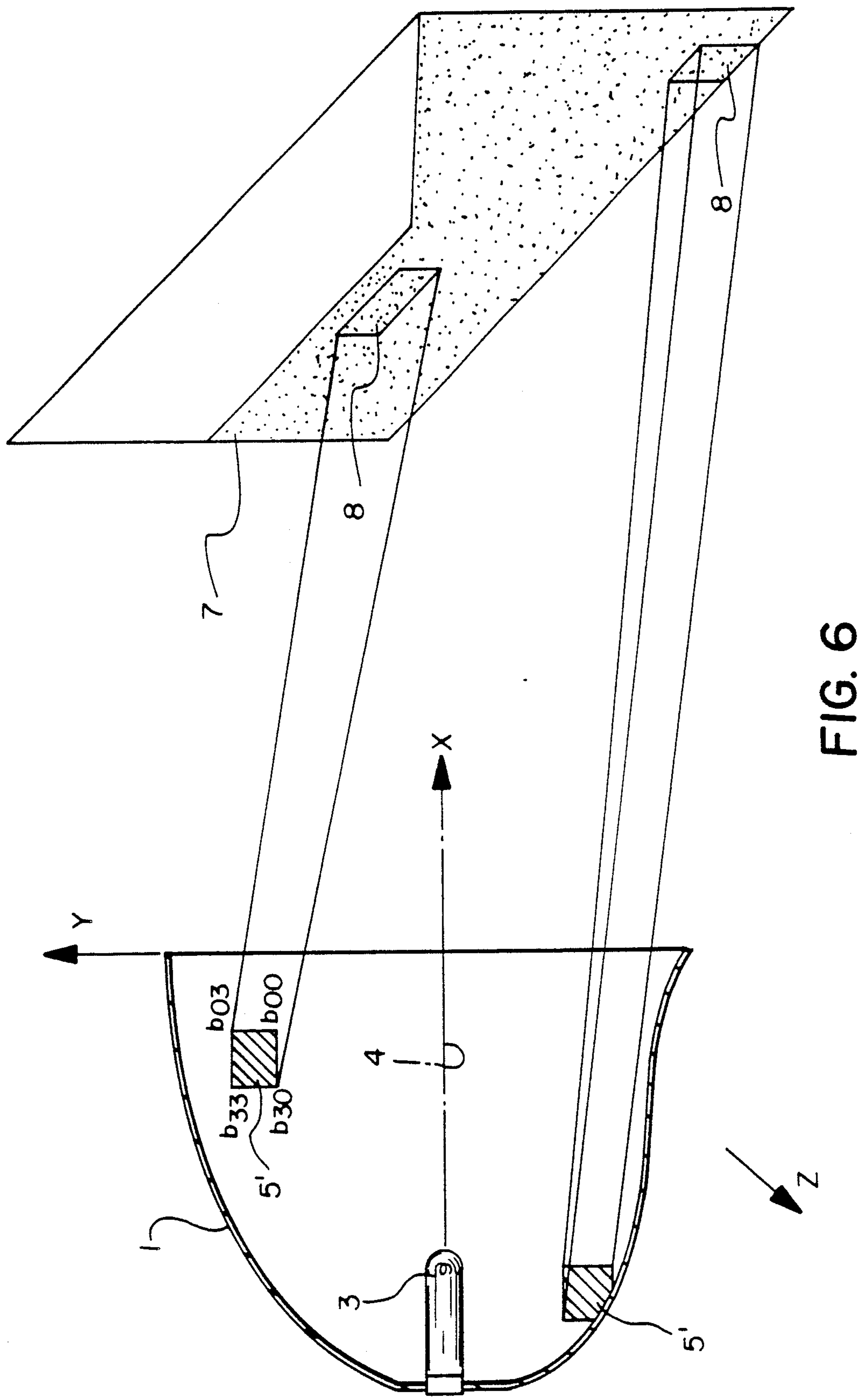

FIGS. 3*a*, 3*b* are a schematic representation of two of many possible examples for the illumination of a surface to be illuminated which can be achieved when using the headlight according to the invention, FIG. 4 is a projection, parallel to the headlight axis "X", onto a plane normal to the X axis, of the optically effective surface of the headlight divided up into surface segments, FIG. 5 shows an enlarged representation of one surface segment according to FIG. 4, and FIG. 6 shows the optical path of the light rays between the optically effective surface according to FIG. 1 and a surface to be illuminated.

Table I shows the parameters for calculating the reflector surface by means of the above-mentioned formula, Table II shows the parameters for calculating the surfaces of a lens arranged in front of the reflector which lens, together with the reflector surface, forms the optically effective system of a first embodiment of the headlight, by means of the abovementioned formula, Tables III and IV show the coefficients (b) of the bivariate polynomials for defining the surface segments of the optically effective surface formed of the reflector surface and a lens surface according to the first embodiment.

Table V shows the "b" coefficients of the Basis-Spline-Method for defining the optically effective surface of the second embodiment of the headlight.

As shown in FIG. 1, the optically effective surface of the headlight according to a first embodiment of the invention is designed asymmetrically on a reflector 1. A lens 2 is arranged coaxially to the headlight axis 4. Reference numeral 3 designates a light source arranged within the reflector (e.g., a double filament lamp). The arrangement of the above-mentioned components on the headlight axis 4 represents one of several possible embodiments.

In addition to the surface of reflector 1, it is possible to form at least one surface of lens 2 such that one surface is characterized by point asymmetry in all planes cutting said surface, which is a part of the optically effective surface.

Moreover, lens 2 may be arranged in an offset and/or tilted relation to the headlight axis 4 to effect light emission in one or several directions other than the main direction of emission.

The glass or plastic lens 2 itself can also be used for sealing the front of the headlight. In this case, a separate front glass having an optically effective surface pattern is not required. For this purpose, at least the outer surface of the lens is scratch-resistant. Instead of the lens being used as a headlight component, a planar plate can be inserted, e.g. in the second embodiment.

For an intense light emission a double-filament lamp is provided as light source 3 so that the headlight can be used in the low and high beam mode.

The reflector surface and/or the optically effective lens surface can be described by means of the formula given in the introduction to the description.

The $12\times21=252$ parameters $Rc_m$, $Rs_m$, $Kc_i$, $Ks_i$, $AKc_{nk}$ and $AKs_{nk}$ of a reflector surface satisfying the metioned formula are given in Table I. Together with a lens which is placed in front of the reflector and the two surfaces of which are defined by the parameters given in Table II, the reflector surface forms the optically effective surface of a first embodiment of the headlight according to the invention.

The addition of E-02 or E+02 at the end of the numerical values given in Tables I and II means that such values must be multiplied by $10^{-2}$ or $10^{+2}$ respectively.

The values given in Table II indicate that the first lens surface has an infinitely large radius of curvature and thus represents a plane. As the second lens surface is defined only by the parameter values for me=ie=ke=0, said surface represents a surface of rotation about the headlight axis.

Using the above-described embodiment of a headlight an illumination of the surface to be illuminated will be achieved as stated in FIG. 3*b* in a schematically simplified form.

An initial surface used in performing the first step of a first method is based on an optically effective surface of a known shape, e.g., a paraboloid of revolution. By calculation, the initial surface is divided up into 100 initial surface segments 5' (FIG. 6), the projections of which, indicated on a plane arranged normal to the headlight axis X, are designated with the reference numeral 5 (FIGS. 4 and 5). For the purpose of simplification, the projections 5 are represented by only 25 surface segments 5' (FIG. 4).

Such sub-division results from the fact that the initial surface is dissected by means of two families of parallel planes, the planes of one of the families extending normal to the planes of the other family and the planes of both families extending parallel to the headlight axis.

With the initial surface segments 5' having thus been calculated, the corners can now be determined. In FIGS. 4 and 6, the Cartesian coordinates X, Y and Z of the headlight are represented, the X-axis defining the headlight axis. The X-coordinates of the corners $b_{00}$, $b_{03}$, $b_{30}$ and $b_{33}$ of each surface segment 5' are inserted in the following bivariate polynomial as corner coefficients:

$$X(y,z) = (1-y)^3 \cdot [b_{00} \cdot (1-z)^3 + b_{10} \cdot 3 \cdot (1-z)^2 \cdot z + b_{20} \cdot 3 \cdot (1-z) \cdot z^2 + b_{30} \cdot z^3] + 3 \cdot (1-y)^2 \cdot y \cdot [b_{01} \cdot (1-z)^3 + b_{11} \cdot 3 \cdot (1-z)^2 \cdot z + b_{21} \cdot 3 \cdot (1-z) \cdot z^2 + b_{31} \cdot z^3] + 3 \cdot (1-y) \cdot y^2 \cdot [b_{02} \cdot (1-z)^3 + b_{12} \cdot 3 \cdot (1-z)^2 \cdot z + b_{22} \cdot 3 \cdot (1-z) \cdot z^2 + b_{32} \cdot z^3] + y^3 \cdot [b_{03} \cdot (1-z)^3 + b_{13} \cdot 3 \cdot (1-z)^2 \cdot z + b_{23} \cdot 3 \cdot (1-z) \cdot z^2 + b_{33} \cdot z^3]$$

wherein "y" and "z" (FIG. 5) in contrast to "X" and "Z" (FIG. 4), are Cartesian coordinates starting from corners 6 (FIG. 5) of each surface segment having the "X" coordinate "$b_{00}$".

If the Bezier method is used, the remaining coefficients of the bivariate polynomials of each surface segment, are then calculated according to this method such that the polynomials are identical in the lines of contact of adjacent surface segments through the second derivatives. The Bezier method is disclosed, for example, in W. Boehm, Gose, Einfuehrung in die Methoden der Numerischen Mathematik, Vieweg Verlag, Braunschweig, 1977, Pages 108–119. The bivariate polynomials thus calculated result in surface segments which are approximations to the initial surface segments. If then the corner coefficients of the polynomials of surface segments are varied at desired loci of the optically effective surface and subsequently, as described above, the remaining coefficients are calculated, a local change of the shape of the surface described by the polynomials will be possible, without changing other regions of that surface.

In order to obtain an optically effective surface having the desired properties, the corner coefficients of the polynomials and subsequently the remaining coefficients are step by step changed such that the desired light distribution is achieved, which can be checked each time a change has been made. This procedure is continued until the resulting mathematical surface representation achieves the desired optical properties.

The larger the number of the surface segments 5', the more the desired light distribution on the surface to be illuminated is achieved. The same applies to the degree of the bivariate polynomials, that's to say the higher the degree of the polynomials, the more the desired light distribution on the surface to be illuminated is achieved.

Proceeding from corner 6, each projection 5 of a surface segment 5' extends in "y" and "z" directions by the standardized unit of 0 to 1. In the embodiment, this unit is characterized by a polynomial having sixteen b coefficients ($b_{00}$ through $b_{33}$). For each surface segment the values for "y" and "z" are inserted in the polynomial and the coordinate "X" is calculated. The projections 5 of the surface segments 5' may be square or rectangular. The corners 6 of adjacent surface segments must, however, coincide in order to obtain the desired continuity at the contacting lines of adjacent surface segments and thus a continuity of the total reflector surface.

FIG. 5 shows an enlarged representation of a projection 5 of a surface segment 5' of the surface of reflector 1. Part of the surface segment 5' directs a light beam to the surface 7 to be illuminated (FIG. 6). In this connection, the shape of the projected image is defined by the part of the surface segment 5' forming a curve in the Y and Z directions. Depending on the required shape of the surface 7 to be illuminated, the individual adjacent surface segments are oriented such that each surface segment 5' corresponds to an area 8 on surface 7. If desired, areas 8 of different surface segments 5' may overlap or even coincide. The distribution of the amount of light on the surface 7 to be illuminated is not limited to uniformly distributing light across the total surface but, if desired, the light intensity may vary continuously across the surface to be illuminated.

In Tables III, Pages 1 through 20, and IV the "b" coefficients of the surface segments of the first embodiment of a headlight are given, said segments being described by the above-mentioned formula of bivariate polynomials. The surface segments are designated "Segments RS" in the above tables, with R and S representing the lines and columns, respectively, shown in FIG. 4.

The surface segments given in Table III form the reflector surface and the values given in Table IV define the two surfaces of a lens which is arranged in front of the reflector and, together with the reflector surface, forms the optically effective surface of the headlight effecting the illumination of the surface to be illuminated given approximately in FIG. 3*b*.

As will be apparent from Table IV, in this embodiment, too, the first lens surface is a plane. It follows from the values $b=0$ that for all loci of all surface segments, X will always be 0.

A headlight in compliance with the values given in Tables I and II or III and IV is designed such that the distance between the planar surface of lens 2 which is arranged coaxially to the axis of reflector 1 and the apex of the reflector amounts to 118 millimeters.

The preferred method for representing and manipulating the coefficients of the bivariate polynominals of the segments representing an optically effective surface for the headlight uses the Basis-spline Method according to De Boor (see "A PRACTICAL GUIDE TO SPLINES", Applied Mathematical Sciences, Volume 27, Springer Verlag Berlin, Heidelberg, N.Y.

According to this method, as in the previously described method, first bivariate polynomials are determined describing initial surface segments having desired optical properties of a region of the optically effective surface and beginning with this initial region, further bivariate polynomials are determined located adjacent to said region, until an approximate surface to said optical surface is achieved.

The achieved approximate surface is then changed locally by varying coefficients of said Basis splines while retaining continuity through the second derivatives within the varied region, without influencing optical properties of other regions of said approximate surface. Continuing in this manner the approximate surface is varied until the resulting representation of said optical surface achieves desired optical properties.

In this B-spline method for representing the optical surface, the X-range of 0 to 67 mm and phi-range of 0 to 360 degrees are divided into sub-intervals by means of partition points. Knot sequences for said ranges and sub-intervals are chosen so that fourth order B-splines in the respective variables are continuous through the second derivative. The B-splines in the X variable satisfy "not-a-know" end conditions. The B-splines in the phi variable satisfy periodic end conditions. Within the range of the variables, division points and knot sequences the resulting B-spline sequences will be denoted by $B_k(x)$, K=1 to 15, and $P_j(\text{phi})$, j=1 to 15. Said reflector surface is then represented by means of the expression $$\text{rho} = \sum_{k=1}^{15} \sum_{j=1}^{15} b_{kj} B_k(x) P_j(\text{phi})$$

where rho is the radius of said reflector surface at position x along the cylindrical coordinate (X-axis) axis and at angle phi with respect to the z-axis.

The Table V shows the coefficients $[b_{kj}]$ and knot sequences for the x variable and phi variable of a second embodiment. These data are sufficient input data for a computer to calculate a reflector surface having the desired properties when a light source lamp of known characteristics is used, e.g., a halogen H4 lamp. Referring to FIG. 2, said light source should be positioned so that the axis of its low beam filament is coincident with the x-axis with the end of the filament closest to the base located at x=29 mm. Said lamp should be oriented so that its reference pin is at angle 75° as measured from the x-axis according to the diagram in FIG. 2. The H4 lamp has three pins to orient the lamp in a housing, one of them being the reference pin.

The data indicated in the Tables I to V are generated by a computer, for instance of the type Micro-Vax 2000 using the FORTRAN language. In a subsequent step these data, representing a net of X, Y and Z coordinates, are transferred to a CAD (Computer Aided Design) Anvil program as generated by the Manufacturing Consulting System Company, U.S.A. By this program the data are converted such that a numerically controlled machine of the Fidia Company, Turin, is controlled. Eventually, the numerically controlled machine controls a milling machine of the Bohner and Koehle Company in Esslingen, Germany, for producing a reflector for a vehicular headlight according to the invention such as by forming a mold by which an optical surface of a vehicular headlight can be replicated.

TABLE I

Reflector surface formula parameters for the first embodiment

Reflector Surface

TABLE I-continued

Reflector surface formula parameters for the first embodiment

| m | $RC_m$ | $RS_m$ |
|---|---|---|
| 0 | 0.301025616E+02 | 0.000000000E+00 |
| 1 | −0.776138504E+00 | 0.320000048E+01 |
| 2 | 0.133370183E+01 | 0.130136414E+01 |
| 3 | 0.215025141E+00 | 0.869100269E+00 |
| 4 | 0.268470260E+00 | 0.200731876E+00 |
| 5 | 0.184987154E+00 | 0.351886168E−01 |
| 6 | 0.129671173E+00 | −0.403600103E−01 |
| 7 | 0.637230940E−01 | 0.320512819E−02 |
| 8 | 0.657042305E−01 | −0.106397102E−01 |
| 9 | 0.423533490E−01 | −0.160708906E−01 |
| 10 | 0.335088888E−01 | −0.192834327E−01 |
| 11 | 0.137164324E−01 | −0.874839426E−02 |
| 12 | 0.139906237E−01 | −0.376991649E−02 |
| 13 | 0.732057473E−02 | −0.646410508E−02 |
| 14 | 0.422798314E−02 | −0.420884650E−02 |
| 15 | −0.408471796E−05 | −0.212006914E−02 |
| 16 | −0.704443620E−04 | 0.516378266E−03 |
| 17 | −0.860155419E−04 | −0.110971614E−02 |
| 18 | −0.110987691E−02 | −0.342223479E−03 |
| 19 | −0.897140376E−03 | 0.107453809E−03 |
| 20 | −0.131258234E−02 | 0.000000000E+00 |
| i | $KC_i$ | $KS_i$ |
| 0 | −0.429484813E+00 | 0.000000000E+00 |
| 1 | −0.163727284E−01 | 0.337263117E−01 |
| 2 | −0.198936600E−01 | −0.608890656E−02 |
| 3 | −0.308477079E−01 | 0.338959596E−01 |
| 4 | −0.141336284E−01 | −0.271903061E−02 |
| 5 | −0.167193963E−01 | 0.727648203E−03 |
| 6 | −0.595014034E−02 | −0.238452148E−03 |
| 7 | −0.601753028E−02 | 0.677091093E−05 |
| 8 | −0.324424750E−02 | −0.259145831E−03 |
| 9 | −0.339949576E−02 | −0.629192629E−03 |
| 10 | −0.153724151E−02 | 0.366436132E−04 |
| 11 | −0.113067112E−02 | −0.259073714E−03 |
| 12 | −0.665049967E−03 | −0.114321751E−04 |
| 13 | −0.521768369E−03 | −0.175471175E−03 |
| 14 | −0.176222083E−03 | 0.411897732E−04 |
| 15 | −0.167376998E−04 | −0.221832787E−04 |
| 16 | 0.666650797E−06 | 0.468744564E−05 |
| 17 | −0.647191699E−05 | −0.125775018E−04 |
| 18 | 0.572639607E−04 | 0.108406081E−04 |
| 19 | 0.325077313E−04 | 0.152450517E−04 |
| 20 | 0.541442594E−04 | 0.000000000E+00 |
| | Parameters $AKC_{nk}$ and $AKS_{nk}$ | |
| k | $AKC_{4k}$ | $AKS_{4k}$ |
| 0 | 0.231351989E−06 | 0.000000000E+00 |
| 1 | 0.428899918E−06 | −0.108098732E−06 |
| 2 | −0.760933804E−06 | −0.171556708E−06 |
| 3 | −0.139034183E−06 | −0.114824840E−06 |
| 4 | −0.139181386E−06 | −0.900163969E−08 |
| 5 | −0.113484337E−06 | −0.113165928E−07 |
| 6 | −0.692201245E−07 | 0.958364387E−08 |
| 7 | −0.388947559E−07 | −0.430786403E−08 |
| 8 | −0.350219486E−07 | 0.439361829E−08 |
| 9 | −0.254912711E−07 | 0.126138438E−09 |
| 10 | −0.181330145E−07 | 0.301827822E−08 |
| 11 | −0.818303372E−08 | 0.367433193E−09 |
| 12 | −0.757240546E−08 | 0.721395733E−09 |
| 13 | −0.434684382E−08 | 0.626818371E−09 |
| 14 | −0.232837908E−08 | 0.302391591E−09 |
| 15 | 0.757435359E−11 | 0.282154895E−09 |
| 16 | 0.501081833E−10 | −0.165543715E−09 |
| 17 | 0.278723188E−10 | 0.185979282E−09 |
| 18 | 0.615322577E−09 | −0.568771854E−10 |
| 19 | 0.499060558E−09 | 0.672723983E−11 |
| 20 | 0.747285538E−09 | 0.000000000E+00 |
| k | $AKC_{6k}$ | $AKS_{6k}$ |
| 0 | 0.389873399E−09 | 0.000000000E+00 |
| 1 | −0.517405133E−09 | 0.116609985E−09 |
| 2 | −0.987346505E−10 | −0.333227667E−09 |
| 3 | 0.961538761E−10 | 0.683053625E−10 |
| 4 | 0.199160759E−09 | −0.683418244E−10 |
| 5 | 0.757325818E−10 | 0.331761612E−11 |
| 6 | 0.618804033E−10 | 0.635190239E−11 |
| 7 | 0.236550982E−10 | 0.810501473E−12 |
| 8 | 0.311269008E−10 | −0.263245260E−12 |

TABLE I-continued

Reflector surface formula parameters for the first embodiment

| | | |
|---|---|---|
| 9 | 0.153069516E−10 | −0.918383261E−12 |
| 10 | 0.111863867E−10 | 0.436905887E−11 |
| 11 | 0.429446358E−11 | −0.472278719E−12 |
| 12 | 0.451515603E−11 | 0.616508050E−12 |
| 13 | 0.244626543E−11 | −0.394652800E−12 |
| 14 | 0.715797983E−12 | 0.123305623E−11 |
| 15 | −0.109601896E−12 | −0.108762629E−12 |
| 16 | 0.197247490E−12 | −0.975652160E−13 |
| 17 | 0.946855192E−13 | −0.643161886E−13 |
| 18 | −0.479375138E−13 | 0.162114621E−12 |
| 19 | −0.169187338E−12 | 0.154258155E−13 |
| 20 | 0.253073865E−12 | 0.000000000E+00 |

| k | $AKC_{8k}$ | $AKS_{8k}$ |
|---|---|---|
| 0 | −0.237072296E−12 | 0.000000000E+00 |
| 1 | −0.400715346E−12 | 0.822888353E−13 |
| 2 | 0.279627689E−12 | −0.184683304E−12 |
| 3 | −0.163001548E−12 | −0.161179791E−12 |
| 4 | −0.160168487E−12 | −0.438313897E−13 |
| 5 | −0.796791834E−13 | 0.661726193E−14 |
| 6 | −0.462152595E−13 | 0.208456218E−14 |
| 7 | −0.309828591E−13 | 0.434925264E−14 |
| 8 | −0.241252882E−13 | −0.117592616E−14 |
| 9 | −0.168868959E−13 | 0.492526452E−14 |
| 10 | −0.805788603E−14 | 0.224656989E−14 |
| 11 | −0.616096672E−14 | 0.152796660E−14 |
| 12 | −0.332907991E−14 | 0.249806639E−15 |
| 13 | −0.262701330E−14 | 0.625937910E−15 |
| 14 | −0.385394236E−15 | 0.758992617E−15 |
| 15 | −0.193135632E−15 | −0.234130584E−15 |
| 16 | −0.171484070E−15 | −0.278481862E−16 |
| 17 | 0.382610016E−16 | −0.148401907E−15 |
| 18 | 0.308505036E−16 | 0.121764340E−15 |
| 19 | 0.208687007E−15 | −0.154399611E−15 |
| 20 | −0.266729468E−15 | 0.000000000E+00 |

| k | $AKC_{10k}$ | $AKS_{10k}$ |
|---|---|---|
| 0 | 0.713321483E−16 | 0.000000000E+00 |
| 1 | 0.533706811E−15 | −0.234348896E−15 |
| 2 | 0.164872968E−15 | −0.272667708E−16 |
| 3 | 0.687919021E−16 | −0.134748556E−15 |
| 4 | −0.162835300E−17 | −0.117704199E−17 |
| 5 | 0.246731742E−16 | −0.230461320E−17 |
| 6 | 0.667927093E−17 | 0.158436254E−17 |
| 7 | 0.126072927E−16 | 0.456377162E−18 |
| 8 | 0.409966370E−17 | 0.742187412E−18 |
| 9 | 0.626217680E−17 | 0.277419772E−17 |
| 10 | 0.311769925E−17 | 0.487166504E−18 |
| 11 | 0.297046067E−17 | 0.117760624E−17 |
| 12 | 0.141248674E−17 | 0.118570563E−18 |
| 13 | 0.103907576E−17 | 0.763942076E−18 |
| 14 | 0.544805755E−18 | 0.448408484E−19 |
| 15 | 0.206840560E−18 | 0.115951610E−18 |
| 16 | −0.632872999E−19 | −0.274282156E−19 |
| 17 | −0.108099972E−18 | 0.584383839E−19 |
| 18 | −0.214743921E−18 | −0.103994833E−19 |
| 19 | −0.149633902E−18 | −0.583100804E−19 |
| 20 | −0.305316901E−18 | 0.000000000E+00 |

TABLE II

Lens surface formula parameters for the first embodiment

| | | |
|---|---|---|
| | First lens surface | |
| m | $RC_m$ | $RS_m$ |
| 0 | 0.999999999E+35 | 0.000000000E+00 |
| | Second lens surface | |
| m | $RC_m$ | $RS_m$ |
| 0 | −0.270000000E+02 | 0.000000000E+00 |
| i | $KC_i$ | $KS_i$ |
| 0 | −0.160000000E+01 | 0.000000000E+00 |
| k | $AKC_{4k}$ | $AKS_{4k}$ |
| 0 | 0.160000000E−05 | 0.000000000E+00 |
| k | $AKC_{6k}$ | $AKS_{6k}$ |
| 0 | −0.910000000E−08 | 0.000000000E+00 |
| k | $AKC_{8k}$ | $AKS_{8k}$ |

TABLE II-continued

Lens surface formula parameters for the first embodiment

| | | |
|---|---|---|
| 0 | 0.250000000E−11 | 0.000000000E+00 |

Note:
Rotational symmetry is indicated if only the value shown in the top row of a coefficient column (Table 1) is other than zero, with values in all other rows being zero.

TABLE III

Coefficients of the bivariate polynomials according to the Bezier method for the first embodiment
REFLECTOR SURFACE

| | s | | | |
|---|---|---|---|---|
| r | 3 | 2 | 1 | 0 |
| Segments(R,S) R 1 S 1 b(s,r), wherein (s,r) are the indices of "b" according to FIG. 5 | | | | |
| 3 | 0.000 | 0.000 | 33.948 | 30.885 |
| 2 | 0.000 | 0.000 | 29.463 | 26.400 |
| 1 | 32.780 | 28.998 | 25.686 | 23.628 |
| 0 | 29.429 | 25.648 | 23.280 | 21.222 |
| Segments(R,S) R 1 S 2 b(s,r) | | | | |
| 3 | 30.885 | 27.822 | 25.895 | 24.273 |
| 2 | 26.400 | 23.337 | 22.535 | 20.913 |
| 1 | 23.628 | 21.570 | 19.706 | 18.348 |
| 0 | 21.222 | 19.164 | 17.543 | 16.184 |
| Segments(R,S) R 1 S 3 b(s,r) | | | | |
| 3 | 24.273 | 22.651 | 21.432 | 20.484 |
| 2 | 20.913 | 19.291 | 18.359 | 17.411 |
| 1 | 18.348 | 16.990 | 15.806 | 14.961 |
| 0 | 16.184 | 14.826 | 13.745 | 12.899 |
| Segments(R,S) R 1 S 4 b(s,r) | | | | |
| 3 | 20.484 | 19.537 | 18.871 | 18.454 |
| 2 | 17.411 | 16.463 | 15.891 | 15.473 |
| 1 | 14.961 | 14.115 | 13.461 | 13.072 |
| 0 | 12.899 | 12.053 | 11.445 | 11.056 |
| Segments(R,S) R 1 S 5 b(s,r) | | | | |
| 3 | 18.454 | 18.037 | 17.869 | 17.939 |
| 2 | 15.473 | 15.056 | 14.885 | 14.954 |
| 1 | 13.072 | 12.683 | 12.513 | 12.548 |
| 0 | 11.056 | 10.667 | 10.498 | 10.533 |
| Segments(R,S) R 1 S 6 b(s,r) | | | | |
| 3 | 17.939 | 18.008 | 18.325 | 18.929 |
| 2 | 14.954 | 15.024 | 15.241 | 15.845 |
| 1 | 12.548 | 12.584 | 12.884 | 13.367 |
| 0 | 10.533 | 10.568 | 10.813 | 11.297 |
| Segments(R,S) R 1 S 7 b(s,r) | | | | |
| 3 | 18.929 | 19.534 | 20.422 | 21.674 |
| 2 | 15.845 | 16.449 | 17.102 | 18.353 |
| 1 | 13.367 | 13.851 | 14.703 | 15.714 |
| 0 | 11.297 | 11.780 | 12.501 | 13.512 |
| Segments(R,S) R 1 S 8 b(s,r) | | | | |
| 3 | 21.674 | 22.926 | 24.531 | 26.682 |
| 2 | 18.353 | 19.605 | 20.727 | 22.879 |
| 1 | 15.714 | 16.726 | 18.267 | 19.958 |
| 0 | 13.512 | 14.523 | 15.822 | 17.513 |
| Segments(R,S) R 1 S 9 b(s,r) | | | | |
| 3 | 26.682 | 28.834 | 31.382 | 35.462 |
| 2 | 22.879 | 25.031 | 26.047 | 30.127 |
| 1 | 19.958 | 21.648 | 24.163 | 26.856 |
| 0 | 17.513 | 19.203 | 21.274 | 23.967 |
| Segments(R,S) R 1 S 10 b(s,r) | | | | |
| 3 | 35.462 | 39.543 | 0.000 | 0.000 |
| 2 | 30.127 | 34.208 | 0.000 | 0.000 |
| 1 | 26.856 | 29.549 | 33.989 | 39.038 |
| 0 | 23.967 | 26.660 | 29.743 | 34.793 |
| Segments(R,S) R 2 S 1 b(s,r) | | | | |

TABLE III-continued

Coefficients of the bivariate polynomials according to the Bezier method for the first embodiment
REFLECTOR SURFACE

| | s | | | |
|---|---|---|---|---|
| r | 3 | 2 | 1 | 0 |
| 3 | 29.429 | 25.648 | 23.280 | 21.222 |
| 2 | 26.079 | 22.298 | 20.874 | 18.816 |
| 1 | 23.915 | 21.136 | 18.775 | 16.958 |
| 0 | 22.144 | 19.364 | 17.257 | 15.440 |
| Segments(R,S) R 2 S 2 | | | | |
| b(s,r) | | | | |
| 3 | 21.222 | 19.164 | 17.543 | 16.184 |
| 2 | 18.816 | 16.758 | 15.379 | 14.020 |
| 1 | 16.958 | 15.140 | 13.546 | 12.290 |
| 0 | 15.440 | 13.622 | 12.126 | 10.869 |
| Segments(R,S) R 2 S 3 | | | | |
| b(s,r) | | | | |
| 3 | 16.184 | 14.826 | 13.745 | 12.899 |
| 2 | 14.020 | 12.662 | 11.683 | 10.837 |
| 1 | 12.290 | 11.033 | 9.968 | 9.176 |
| 0 | 10.869 | 9.613 | 8.602 | 7.810 |
| Segments(R,S) R 2 S 4 | | | | |
| b(s,r) | | | | |
| 3 | 12.899 | 12.053 | 11.445 | 11.056 |
| 2 | 10.837 | 9.991 | 9.429 | 9.040 |
| 1 | 9.176 | 8.385 | 7.784 | 7.416 |
| 0 | 7.810 | 7.019 | 6.448 | 6.080 |
| Segments(R,S) R 2 S 5 | | | | |
| b(s,r) | | | | |
| 3 | 11.056 | 10.667 | 10.498 | 10.533 |
| 2 | 9.040 | 8.651 | 8.482 | 8.517 |
| 1 | 7.416 | 7.047 | 6.878 | 6.897 |
| 0 | 6.080 | 5.711 | 5.546 | 5.564 |
| Segments(R,S) R 2 S 6 | | | | |
| b(s,r) | | | | |
| 3 | 10.533 | 10.568 | 10.813 | 11.297 |
| 2 | 8.517 | 8.552 | 8.742 | 9.226 |
| 1 | 6.897 | 6.915 | 7.150 | 7.567 |
| 0 | 5.564 | 5.583 | 5.789 | 6.205 |
| Segments(R,S) R 2 S 7 | | | | |
| b(s,r) | | | | |
| 3 | 11.297 | 11.780 | 12.501 | 13.512 |
| 2 | 9.226 | 9.709 | 10.299 | 11.310 |
| 1 | 7.567 | 7.983 | 8.682 | 9.555 |
| 0 | 6.205 | 6.622 | 7.248 | 8.121 |
| Segments(R,S) R 2 S 8 | | | | |
| b(s,r) | | | | |
| 3 | 13.512 | 14.523 | 15.822 | 17.513 |
| 2 | 11.310 | 12.321 | 13.377 | 15.068 |
| 1 | 9.555 | 10.428 | 11.689 | 13.132 |
| 0 | 8.121 | 8.994 | 10.113 | 11.556 |
| Segments(R,S) R 2 S 9 | | | | |
| b(s,r) | | | | |
| 3 | 17.513 | 19.203 | 21.274 | 23.967 |
| 2 | 15.068 | 16.758 | 18.386 | 21.079 |
| 1 | 13.132 | 14.575 | 16.590 | 18.836 |
| 0 | 11.556 | 12.999 | 14.763 | 17.008 |
| Segments(R,S) R 2 S 10 | | | | |
| b(s,r) | | | | |
| 3 | 23.967 | 26.660 | 29.743 | 34.793 |
| 2 | 21.079 | 23.772 | 25.498 | 30.547 |
| 1 | 18.836 | 21.082 | 24.247 | 27.825 |
| 0 | 17.008 | 19.254 | 21.952 | 25.529 |
| Segments(R,S) R 3 S 1 | | | | |
| b(s,r) | | | | |
| 3 | 22.144 | 19.364 | 17.257 | 15.440 |
| 2 | 20.372 | 17.592 | 15.739 | 13.922 |
| 1 | 19.129 | 16.647 | 14.486 | 12.755 |
| 0 | 18.096 | 15.615 | 13.602 | 11.871 |
| Segments(R,S) R 3 S 2 | | | | |
| b(s,r) | | | | |
| 3 | 15.440 | 13.622 | 12.126 | 10.869 |
| 2 | 13.922 | 12.104 | 10.705 | 9.449 |
| 1 | 12.755 | 11.025 | 9.550 | 8.342 |
| 0 | 11.871 | 10.140 | 8.700 | 7.491 |
| Segments(R,S) R 3 S 3 | | | | |
| b(s,r) | | | | |
| 3 | 10.869 | 9.613 | 8.602 | 7.810 |

TABLE III-continued

Coefficients of the bivariate polynomials according to the Bezier method for the first embodiment
REFLECTOR SURFACE

| | s | | | |
|---|---|---|---|---|
| r | 3 | 2 | 1 | 0 |
| 2 | 9.449 | 8.192 | 7.236 | 6.445 |
| 1 | 8.342 | 7.133 | 6.138 | 5.376 |
| 0 | 7.491 | 6.283 | 5.310 | 4.548 |
| Segments(R,S) R 3 S 4 | | | | |
| b(s,r) | | | | |
| 3 | 7.810 | 7.019 | 6.448 | 6.080 |
| 2 | 6.445 | 5.653 | 5.112 | 4.743 |
| 1 | 5.376 | 4.614 | 4.053 | 3.696 |
| 0 | 4.548 | 3.786 | 3.236 | 2.880 |
| Segments(R,S) R 3 S 5 | | | | |
| b(s,r) | | | | |
| 3 | 6.080 | 5.711 | 5.546 | 5.564 |
| 2 | 4.743 | 4.375 | 4.213 | 4.232 |
| 1 | 3.696 | 3.340 | 3.178 | 3.188 |
| 0 | 2.880 | 2.523 | 2.362 | 2.372 |
| Segments(R,S) R 3 S 6 | | | | |
| b(s,r) | | | | |
| 3 | 5.564 | 5.583 | 5.789 | 6.205 |
| 2 | 4.232 | 4.250 | 4.427 | 4.844 |
| 1 | 3.188 | 3.198 | 3.399 | 3.781 |
| 0 | 2.372 | 2.382 | 2.569 | 2.951 |
| Segments(R,S) R 3 S 7 | | | | |
| b(s,r) | | | | |
| 3 | 6.205 | 6.622 | 7.248 | 8.121 |
| 2 | 4.844 | 5.261 | 5.814 | 6.687 |
| 1 | 3.781 | 4.164 | 4.776 | 5.574 |
| 0 | 2.951 | 3.334 | 3.911 | 4.709 |
| Segments(R,S) R 3 S 8 | | | | |
| b(s,r) | | | | |
| 3 | 8.121 | 8.994 | 10.113 | 11.556 |
| 2 | 6.687 | 7.560 | 8.536 | 9.979 |
| 1 | 5.574 | 6.372 | 7.464 | 8.765 |
| 0 | 4.709 | 5.508 | 6.526 | 7.826 |
| Segments(R,S) R 3 S 9 | | | | |
| b(s,r) | | | | |
| 3 | 11.556 | 12.999 | 14.763 | 17.008 |
| 2 | 9.979 | 11.422 | 12.935 | 15.181 |
| 1 | 8.765 | 10.065 | 11.786 | 13.781 |
| 0 | 7.826 | 9.127 | 10.707 | 12.702 |
| Segments(R,S) R 3 S 10 | | | | |
| b(s,r) | | | | |
| 3 | 17.008 | 19.254 | 21.952 | 25.529 |
| 2 | 15.181 | 17.427 | 19.657 | 23.234 |
| 1 | 13.781 | 15.776 | 18.424 | 21.515 |
| 0 | 12.702 | 14.697 | 17.097 | 20.187 |
| Segments(R,S) R 4 S 1 | | | | |
| b(s,r) | | | | |
| 3 | 18.096 | 15.615 | 13.602 | 11.871 |
| 2 | 17.064 | 14.583 | 12.718 | 10.987 |
| 1 | 16.246 | 13.917 | 11.986 | 10.333 |
| 0 | 15.779 | 13.450 | 11.553 | 9.900 |
| Segments(R,S) R 4 S 2 | | | | |
| b(s,r) | | | | |
| 3 | 11.871 | 10.140 | 8.700 | 7.491 |
| 2 | 10.987 | 9.256 | 7.850 | 6.641 |
| 1 | 10.333 | 8.680 | 7.247 | 6.067 |
| 0 | 9.900 | 8.247 | 6.852 | 5.672 |
| Segments(R,S) R 4 S 3 | | | | |
| b(s,r) | | | | |
| 3 | 7.491 | 6.283 | 5.310 | 4.548 |
| 2 | 6.641 | 5.433 | 4.481 | 3.720 |
| 1 | 6.067 | 4.887 | 3.891 | 3.131 |
| 0 | 5.672 | 4.491 | 3.524 | 2.764 |
| Segments(R,S) R 4 S 4 | | | | |
| b(s,r) | | | | |
| 3 | 4.548 | 3.786 | 3.236 | 2.880 |
| 2 | 3.720 | 2.958 | 2.419 | 2.063 |
| 1 | 3.131 | 2.371 | 1.835 | 1.477 |
| 0 | 2.764 | 2.004 | 1.453 | 1.095 |
| Segments(R,S) R 4 S 5 | | | | |
| b(s,r) | | | | |
| 3 | 2.880 | 2.523 | 2.362 | 2.372 |
| 2 | 2.063 | 1.706 | 1.546 | 1.556 |

TABLE III-continued

Coefficients of the bivariate polynomials according to the Bezier method for the first embodiment
REFLECTOR SURFACE

| r | s: 3 | 2 | 1 | 0 |
|---|---|---|---|---|
| 1 | 1.477 | 1.119 | 0.964 | 0.969 |
| 0 | 1.095 | 0.737 | 0.575 | 0.579 |
| Segments(R,S) R 4 S 6 | | | | |
| b(s,r) | | | | |
| 3 | 2.372 | 2.382 | 2.569 | 2.951 |
| 2 | 1.556 | 1.566 | 1.739 | 2.121 |
| 1 | 0.969 | 0.973 | 1.155 | 1.525 |
| 0 | 0.579 | 0.584 | 0.762 | 1.131 |
| Segments(R,S) R 4 S 7 | | | | |
| b(s,r) | | | | |
| 3 | 2.951 | 3.334 | 3.911 | 4.709 |
| 2 | 2.121 | 2.504 | 3.046 | 3.844 |
| 1 | 1.525 | 1.894 | 2.461 | 3.228 |
| 0 | 1.131 | 1.501 | 2.059 | 2.826 |
| Segments(R,S) R 4 S 8 | | | | |
| b(s,r) | | | | |
| 3 | 4.709 | 5.508 | 6.526 | 7.826 |
| 2 | 3.844 | 4.643 | 5.587 | 6.887 |
| 1 | 3.228 | 3.995 | 4.992 | 6.225 |
| 0 | 2.826 | 3.593 | 4.566 | 5.799 |
| Segments(R,S) R 4 S 9 | | | | |
| b(s,r) | | | | |
| 3 | 7.826 | 9.127 | 10.707 | 12.702 |
| 2 | 6.887 | 8.188 | 9.628 | 11.623 |
| 1 | 6.225 | 7.457 | 8.003 | 10.867 |
| 0 | 5.799 | 7.031 | 8.520 | 10.384 |
| Segments(R,S) R 4 S 10 | | | | |
| b(s,r) | | | | |
| [illegible] | 12.702 | 14.697 | 17.097 | 20.187 |
| 2 | 11.623 | 13.618 | 15.769 | 18.860 |
| 1 | 10.867 | 12.732 | 15.078 | 17.933 |
| 0 | 10.384 | 12.249 | 14.483 | 17.338 |
| Segments(R,S) R 5 S 1 | | | | |
| b(s,r) | | | | |
| 3 | 15.779 | 13.450 | 11.553 | 9.900 |
| 2 | 15.312 | 12.983 | 11.120 | 9.467 |
| 1 | 15.179 | 12.753 | 10.975 | 9.284 |
| 0 | 15.609 | 13.184 | 11.235 | 9.545 |
| Segments(R,S) R 5 S 2 | | | | |
| b(s,r) | | | | |
| 3 | 9.900 | 8.247 | 6.852 | 5.672 |
| 2 | 9.467 | 7.814 | 6.457 | 5.277 |
| 1 | 9.284 | 7.594 | 6.271 | 5.074 |
| 0 | 9.545 | 7.854 | 6.438 | 5.241 |
| Segments(R,S) R 5 S 3 | | | | |
| b(s,r) | | | | |
| 3 | 5.672 | 4.491 | 3.524 | 2.764 |
| 2 | 5.277 | 4.096 | 3.157 | 2.396 |
| 1 | 5.074 | 3.877 | 2.967 | 2.194 |
| 0 | 5.241 | 4.043 | 3.069 | 2.295 |
| Segments(R,S) R 5 S 4 | | | | |
| b(s,r) | | | | |
| 3 | 2.764 | 2.004 | 1.453 | 1.095 |
| 2 | 2.396 | 1.636 | 1.072 | 0.714 |
| 1 | 2.194 | 1.420 | 0.901 | 0.521 |
| 0 | 2.295 | 1.522 | 0.950 | 0.569 |
| Segments(R,S) R 5 S 5 | | | | |
| b(s,r) | | | | |
| 3 | 1.095 | 0.737 | 0.575 | 0.579 |
| 2 | 0.714 | 0.356 | 0.186 | 0.190 |
| 1 | 0.521 | 0.141 | 0.000 | 0.000 |
| 0 | 0.569 | 0.189 | 0.000 | 0.000 |
| Segments(R,S) R 5 S 6 | | | | |
| b(s,r) | | | | |
| 3 | 0.579 | 0.584 | 0.762 | 1.131 |
| 2 | 0.190 | 0.195 | 0.368 | 0.738 |
| 1 | 0.000 | 0.000 | 0.169 | 0.544 |
| 0 | 0.000 | 0.000 | 0.186 | 0.561 |
| Segments(R,S) R 5 S 7 | | | | |
| b(s,r) | | | | |
| 3 | 1.131 | 1.501 | 2.059 | 2.826 |
| 2 | 0.738 | 1.108 | 1.657 | 2.424 |
| 1 | 0.544 | 0.919 | 1.466 | 2.235 |

TABLE III-continued

Coefficients of the bivariate polynomials according to the Bezier method for the first embodiment
REFLECTOR SURFACE

| r | s: 3 | 2 | 1 | 0 |
|---|---|---|---|---|
| 0 | 0.561 | 0.936 | 1.500 | 2.269 |
| Segments(R,S) R 5 S 8 | | | | |
| b(s,r) | | | | |
| 3 | 2.826 | 3.593 | 4.566 | 5.799 |
| 2 | 2.424 | 3.191 | 4.140 | 5.372 |
| 1 | 2.235 | 3.004 | 3.960 | 5.182 |
| 0 | 2.269 | 3.038 | 4.010 | 5.232 |
| Segments(R,S) R 5 S 9 | | | | |
| b(s,r) | | | | |
| 3 | 5.799 | 7.031 | 8.520 | 10.384 |
| 2 | 5.372 | 6.605 | 8.037 | 9.901 |
| 1 | 5.182 | 6.404 | 7.864 | 9.691 |
| 0 | 5.232 | 6.454 | 7.923 | 9.751 |
| Segments(R,S) R 5 S 10 | | | | |
| b(s,r) | | | | |
| 3 | 10.384 | 12.249 | 14.483 | 17.338 |
| 2 | 9.901 | 11.766 | 13.888 | 16.743 |
| 1 | 9.691 | 11.519 | 13.702 | 16.479 |
| 0 | 9.751 | 11.578 | 13.758 | 16.536 |
| Segments(R,S) R 6 S 1 | | | | |
| b(s,r) | | | | |
| 3 | 15.609 | 13.184 | 11.235 | 9.545 |
| 2 | 16.039 | 13.614 | 11.495 | 9.805 |
| 1 | 17.160 | 14.241 | 12.556 | 10.614 |
| 0 | 19.011 | 16.092 | 13.832 | 11.890 |
| Segments(R,S) R 6 S 2 | | | | |
| b(s,r) | | | | |
| 3 | 9.545 | 7.854 | 6.438 | 5.241 |
| 2 | 9.805 | 8.114 | 6.604 | 5.407 |
| 1 | 10.614 | 8.672 | 7.411 | 6.049 |
| 0 | 11.890 | 9.948 | 8.346 | 6.984 |
| Segments(R,S) R 6 S 3 | | | | |
| b(s,r) | | | | |
| 3 | 5.241 | 4.043 | 3.069 | 2.295 |
| 2 | 5.407 | 4.210 | 3.170 | 2.396 |
| 1 | 6.049 | 4.686 | 3.835 | 2.919 |
| 0 | 6.984 | 5.621 | 4.496 | 3.580 |
| Segments(R,S) R 6 S 4 | | | | |
| b(s,r) | | | | |
| 3 | 2.295 | 1.522 | 0.950 | 0.569 |
| 2 | 2.396 | 1.623 | 0.998 | 0.617 |
| 1 | 2.919 | 2.003 | 1.453 | 0.962 |
| 0 | 2.580 | 2.664 | 1.964 | 1.473 |
| Segments(R,S) R 6 S 5 | | | | |
| b(s,r) | | | | |
| 3 | 0.569 | 0.189 | 0.000 | 0.000 |
| 2 | 0.617 | 0.237 | 0.000 | 0.000 |
| 1 | 0.962 | 0.470 | 0.239 | 0.223 |
| 0 | 1.473 | 0.981 | 0.698 | 0.683 |
| Segments(R,S) R 6 S 6 | | | | |
| b(s,r) | | | | |
| 3 | 0.000 | 0.000 | 0.186 | 0.561 |
| 2 | 0.000 | 0.000 | 0.203 | 0.578 |
| 1 | 0.223 | 0.208 | 0.407 | 0.796 |
| 0 | 0.683 | 0.668 | 0.859 | 1.248 |
| Segments(R,S) R 6 S 7 | | | | |
| b(s,r) | | | | |
| 3 | 0.561 | 0.936 | 1.500 | 2.269 |
| 2 | 0.578 | 0.953 | 1.534 | 2.303 |
| 1 | 0.796 | 1.186 | 1.757 | 2.552 |
| 0 | 1.248 | 1.638 | 2.223 | 3.019 |
| Segments(R,S) R 6 S 8 | | | | |
| b(s,r) | | | | |
| 3 | 2.269 | 3.038 | 4.010 | 5.232 |
| 2 | 2.303 | 3.072 | 4.060 | 5.282 |
| 1 | 2.552 | 3.348 | 4.310 | 5.563 |
| 0 | 3.019 | 3.815 | 4.818 | 6.071 |
| Segments(R,S) R 6 S 9 | | | | |
| b(s,r) | | | | |
| 3 | 5.232 | 6.454 | 7.923 | 9.751 |
| 2 | 5.282 | 6.504 | 7.982 | 9.810 |
| 1 | 5.563 | 6.815 | 8.258 | 10.119 |
| 0 | 6.071 | 7.324 | 8.824 | 10.684 |

TABLE III-continued

Coefficients of the bivariate polynomials according to the Bezier method for the first embodiment
REFLECTOR SURFACE

| r | s 3 | 2 | 1 | 0 |
|---|---|---|---|---|
| Segments(R,S) R 6 S 10 | | | | |
| b(s,r) | | | | |
| 3 | 9.751 | 11.578 | 13.758 | 16.536 |
| 2 | 9.810 | 11.638 | 13.815 | 16.592 |
| 1 | 10.119 | 11.980 | 14.108 | 16.934 |
| 0 | 10.684 | 12.545 | 14.758 | 17.584 |
| Segments(R,S) R 7 S 1 | | | | |
| b(s,r) | | | | |
| 3 | 19.011 | 16.092 | 13.832 | 11.890 |
| 2 | 20.862 | 17.942 | 15.107 | 13.165 |
| 1 | 23.449 | 19.053 | 17.471 | 14.851 |
| 0 | 27.095 | 22.699 | 19.555 | 16.935 |
| Segments(R,S) R 7 S 2 | | | | |
| b(s,r) | | | | |
| 3 | 11.890 | 9.948 | 8.346 | 6.984 |
| 2 | 13.165 | 11.223 | 9.281 | 7.919 |
| 1 | 14.851 | 12.230 | 10.770 | 9.041 |
| 0 | 16.935 | 14.315 | 12.256 | 10.527 |
| Segments(R,S) R 7 S 3 | | | | |
| b(s,r) | | | | |
| 3 | 6.984 | 5.621 | 4.496 | 3.580 |
| 2 | 7.919 | 6.556 | 5.157 | 4.241 |
| 1 | 9.041 | 7.312 | 6.233 | 5.115 |
| 0 | 10.527 | 8.798 | 7.411 | 6.294 |
| Segments(R,S) R 7 S 4 | | | | |
| b(s,r) | | | | |
| 3 | 3.580 | 2.664 | 1.964 | 1.473 |
| 2 | 4.241 | 3.325 | 2.475 | 1.983 |
| 1 | 5.115 | 3.998 | 3.303 | 2.720 |
| 0 | 6.294 | 5.176 | 4.331 | 3.748 |
| Segments(R,S) R 7 S 5 | | | | |
| b(s,r) | | | | |
| 3 | 1.473 | 0.981 | 0.698 | 0.683 |
| 2 | 1.983 | 1.492 | 1.158 | 1.142 |
| 1 | 2.720 | 2.138 | 1.871 | 1.837 |
| 0 | 3.748 | 3.165 | 2.846 | 2.812 |
| Segments(R,S) R 7 S 6 | | | | |
| b(s,r) | | | | |
| 3 | 0.683 | 0.668 | 0.859 | 1.248 |
| 2 | 1.142 | 1.127 | 1.311 | 1.700 |
| 1 | 1.837 | 1.803 | 1.993 | 2.385 |
| 0 | 2.812 | 2.778 | 2.957 | 3.349 |
| Segments(R,S) R 7 S 7 | | | | |
| b(s,r) | | | | |
| 3 | 1.248 | 1.638 | 2.223 | 3.019 |
| 2 | 1.700 | 2.089 | 2.690 | 3.486 |
| 1 | 2.385 | 2.777 | 3.361 | 4.186 |
| 0 | 3.349 | 3.741 | 4.345 | 5.170 |
| Segments(R,S) R 7 S 8 | | | | |
| b(s,r) | | | | |
| 3 | 3.019 | 3.815 | 4.818 | 6.071 |
| 2 | 3.486 | 4.282 | 5.327 | 6.579 |
| 1 | 4.186 | 5.011 | 6.000 | 7.311 |
| 0 | 5.170 | 5.995 | 7.040 | 8.351 |
| Segments(R,S) R 7 S 9 | | | | |
| b(s,r) | | | | |
| 3 | 6.071 | 7.324 | 8.824 | 10.684 |
| 2 | 6.579 | 7.832 | 9.389 | 11.249 |
| 1 | 7.311 | 8.623 | 10.095 | 12.059 |
| 0 | 8.351 | 9.663 | 11.237 | 13.200 |
| Segments(R,S) R 7 S 10 | | | | |
| b(s,r) | | | | |
| 3 | 10.684 | 12.545 | 14.758 | 17.584 |
| 2 | 11.249 | 13.110 | 15.407 | 18.234 |
| 1 | 12.059 | 14.022 | 16.158 | 19.187 |
| 0 | 13.200 | 15.164 | 17.506 | 20.536 |
| Segments(R,S) R 8 S 1 | | | | |
| b(s,r) | | | | |
| 3 | 27.095 | 22.699 | 19.555 | 16.935 |
| 2 | 30.741 | 26.345 | 21.639 | 19.019 |
| 1 | 24.902 | 3.951 | 25.550 | 21.545 |
| 0 | 46.937 | 25.982 | 29.364 | 25.359 |
| Segments(R,S) R 8 S 2 | | | | |

TABLE III-continued

Coefficients of the bivariate polynomials according to the Bezier method for the first embodiment
REFLECTOR SURFACE

| r | s 3 | 2 | 1 | 0 |
|---|---|---|---|---|
| b(s,r) | | | | |
| 3 | 16.935 | 14.315 | 12.256 | 10.527 |
| 2 | 19.019 | 16.399 | 13.742 | 12.013 |
| 1 | 21.545 | 17.541 | 16.126 | 13.840 |
| 0 | 25.359 | 21.354 | 18.583 | 16.297 |
| Segments(R,S) R 8 S 3 | | | | |
| b(s,r) | | | | |
| 3 | 10.527 | 8.798 | 7.411 | 6.294 |
| 2 | 12.013 | 10.284 | 8.590 | 7.472 |
| 1 | 13.840 | 11.554 | 10.332 | 8.951 |
| 0 | 16.297 | 14.012 | 12.271 | 10.889 |
| Segments(R,S) R 8 S 4 | | | | |
| b(s,r) | | | | |
| 3 | 6.294 | 5.176 | 4.331 | 3.748 |
| 2 | 7.472 | 6.355 | 5.358 | 4.776 |
| 1 | 8.951 | 7.569 | 6.785 | 6.089 |
| 0 | 10.889 | 9.508 | 8.496 | 7.800 |
| Segments(R,S) R 8 S 5 | | | | |
| b(s,r) | | | | |
| 3 | 3.748 | 3.165 | 2.846 | 2.812 |
| 2 | 4.776 | 4.193 | 3.820 | 3.786 |
| 1 | 6.089 | 5.393 | 5.099 | 5.038 |
| 0 | 7.800 | 7.104 | 6.725 | 6.664 |
| Segments(R,S) R 8 S 6 | | | | |
| b(s,r) | | | | |
| 3 | 2.812 | 2.778 | 2.957 | 3.349 |
| 2 | 3.786 | 3.752 | 3.921 | 4.313 |
| 1 | 5.038 | 4.977 | 5.157 | 5.554 |
| 0 | 6.664 | 6.603 | 6.769 | 7.167 |
| Segments(R,S) R 8 S 7 | | | | |
| b(s,r) | | | | |
| 3 | 3.349 | 3.741 | 4.345 | 5.170 |
| 2 | 4.313 | 4.706 | 5.329 | 6.154 |
| 1 | 5.554 | 5.952 | 6.545 | 7.419 |
| 0 | 7.167 | 7.564 | 8.192 | 9.066 |
| Segments(R,S) R 8 S 8 | | | | |
| b(s,r) | | | | |
| 3 | 5.170 | 5.995 | 7.040 | 8.351 |
| 2 | 6.154 | 6.979 | 8.080 | 9.391 |
| 1 | 7.419 | 8.293 | 9.310 | 10.728 |
| 0 | 9.066 | 9.940 | 11.057 | 12.475 |
| Segments(R,S) R 8 S 9 | | | | |
| b(s,r) | | | | |
| 3 | 8.351 | 9.663 | 11.237 | 13.200 |
| 2 | 9.391 | 10.702 | 12.378 | 14.341 |
| 1 | 10.728 | 12.146 | 13.649 | 15.819 |
| 0 | 12.475 | 13.894 | 15.606 | 17.776 |
| Segments(R,S) R 8 S 10 | | | | |
| b(s,r) | | | | |
| 3 | 13.200 | 15.164 | 17.506 | 20.536 |
| 2 | 14.341 | 16.305 | 18.855 | 21.885 |
| 1 | 15.819 | 17.988 | 20.120 | 23.628 |
| 0 | 17.776 | 19.946 | 22.547 | 26.054 |
| Segments(R,S) R 9 S 1 | | | | |
| b(s,r) | | | | |
| 3 | 46.937 | 25.982 | 29.364 | 25.359 |
| 2 | 68.976 | 48.017 | 33.177 | 29.173 |
| 1 | 0.000 | 0.000 | 0.000 | 0.000 |
| 0 | 0.000 | 0.000 | 0.000 | 0.000 |
| Segments(R,S) R 9 S 2 | | | | |
| b(s,r) | | | | |
| 3 | 25.359 | 21.354 | 18.583 | 16.297 |
| 2 | 29.173 | 25.168 | 21.041 | 18.755 |
| 1 | 0.000 | 0.000 | 25.410 | 21.686 |
| 0 | 0.000 | 0.000 | 30.180 | 26.456 |
| Segments(R,S) R 9 S 3 | | | | |
| b(s,r) | | | | |
| 3 | 16.297 | 14.012 | 12.271 | 10.889 |
| 2 | 18.755 | 16.469 | 14.210 | 12.828 |
| 1 | 21.686 | 17.962 | 17.085 | 15.196 |
| 0 | 26.456 | 22.732 | 20.338 | 18.450 |
| Segments(R,S) R 9 S 4 | | | | |
| b(s,r) | | | | |

TABLE III-continued

Coefficients of the bivariate polynomials according to the Bezier method for the first embodiment
REFLECTOR SURFACE

| r | s: 3 | 2 | 1 | 0 |
|---|---|---|---|---|
| 3 | 10.889 | 9.508 | 8.496 | 7.800 |
| 2 | 12.828 | 11.447 | 10.207 | 9.511 |
| 1 | 15.196 | 13.308 | 12.507 | 11.606 |
| 0 | 18.450 | 16.561 | 15.255 | 14.354 |
| Segments(R,S) R 9 S 5 b(s,r) | | | | |
| 3 | 7.800 | 7.104 | 6.725 | 6.664 |
| 2 | 9.511 | 8.815 | 8.351 | 8.290 |
| 1 | 11.606 | 10.704 | 10.388 | 10.282 |
| 0 | 14.354 | 13.452 | 12.963 | 12.856 |
| Segments(R,S) R 9 S 6 b(s,r) | | | | |
| | 6.664 | 6.603 | 6.769 | 7.167 |
| | 8.290 | 8.229 | 8.381 | 8.779 |
| | 10.282 | 10.175 | 10.346 | 10.755 |
| | 12.856 | 12.750 | 12.895 | 13.304 |
| Segments(R,S) R 9 S 7 b(s,r) | | | | |
| | 7.167 | 7.564 | 8.192 | 9.066 |
| | 8.779 | 9.177 | 9.839 | 10.713 |
| | 10.755 | 11.164 | 11.770 | 12.731 |
| | 13.304 | 13.714 | 14.384 | 15.346 |
| Segments(R,S) R 9 S 8 b(s,r) | | | | |
| 3 | 9.066 | 9.940 | 11.057 | 12.475 |
| 2 | 10.713 | 11.587 | 12.804 | 14.223 |
| 1 | 12.731 | 13.693 | 14.738 | 16.366 |
| 0 | 15.346 | 16.307 | 17.555 | 19.183 |
| Segments(R,S) R 9 S 9 b(s,r) | | | | |
| 3 | 12.475 | 13.894 | 15.606 | 17.776 |
| 2 | 14.223 | 15.641 | 17.564 | 19.734 |
| 1 | 16.366 | 17.993 | 19.495 | 22.138 |
| 0 | 19.183 | 20.810 | 22.801 | 25.445 |
| Segments(R,S) R 9 S 10 b(s,r) | | | | |
| 3 | 17.776 | 19.946 | 22.547 | 26.054 |
| 2 | 19.734 | 21.903 | 24.973 | 28.480 |
| 1 | 22.138 | 24.782 | 26.395 | 31.402 |
| 0 | 25.445 | 28.088 | 31.242 | 36.249 |
| Segments(R,S) R 10 S 1 b(s,r) | | | | |
| 3 | 0.000 | 0.000 | 0.000 | 0.000 |
| 2 | 0.000 | 0.000 | 0.000 | 0.000 |
| 1 | 0.000 | 0.000 | 0.000 | 0.000 |
| 0 | 0.000 | 0.000 | 0.000 | 0.000 |
| Segments(R,S) R 10 S 2 b(s,r) | | | | |
| 3 | 0.000 | 0.000 | 30.180 | 26.456 |
| 2 | 0.000 | 0.000 | 34.950 | 31.226 |
| 1 | 0.000 | 0.000 | 0.000 | 0.000 |
| 0 | 0.000 | 0.000 | 0.000 | 0.000 |
| Segments(R,S) R 10 S 3 b(s,r) | | | | |
| 3 | 26.456 | 22.732 | 20.338 | 18.450 |
| 2 | 31.226 | 27.502 | 23.592 | 21.703 |
| 1 | 0.000 | 0.000 | 29.076 | 24.823 |
| 0 | 0.000 | 0.000 | 37.409 | 33.155 |
| Segments(R,S) R 10 S 4 b(s,r) | | | | |
| 3 | 18.450 | 16.561 | 15.255 | 14.354 |
| 2 | 21.703 | 19.814 | 18.003 | 17.102 |
| 1 | 24.823 | 20.569 | 21.827 | 20.331 |
| 0 | 33.155 | 28.901 | 26.933 | 25.436 |
| Segments(R,S) R 10 S 5 b(s,r) | | | | |
| 3 | 14.354 | 13.452 | 12.963 | 12.856 |
| 2 | 17.102 | 16.200 | 15.537 | 15.431 |
| 1 | 20.331 | 18.834 | 18.714 | 18.493 |
| 0 | 25.436 | 23.939 | 23.173 | 22.952 |
| Segments(R,S) R 10 S 6 b(s,r) | | | | |
| 3 | 12.856 | 12.750 | 12.895 | 13.304 |

TABLE III-continued

Coefficients of the bivariate polynomials according to the Bezier method for the first embodiment
REFLECTOR SURFACE

| r | s: 3 | 2 | 1 | 0 |
|---|---|---|---|---|
| 2 | 15.431 | 15.324 | 15.445 | 15.854 |
| 1 | 18.493 | 18.272 | 18.453 | 18.888 |
| 0 | 22.952 | 22.731 | 22.828 | 23.262 |
| Segments(R,S) R 10 S 7 b(s,r) | | | | |
| 3 | 13.304 | 13.714 | 14.384 | 15.346 |
| 2 | 15.854 | 16.263 | 16.999 | 17.960 |
| 1 | 18.888 | 19.323 | 19.879 | 21.059 |
| 0 | 23.262 | 23.697 | 24.466 | 25.645 |
| Segments(R,S) R 10 S 8 b(s,r) | | | | |
| 3 | 15.346 | 16.307 | 17.555 | 19.183 |
| 2 | 17.960 | 18.922 | 20.372 | 22.000 |
| 1 | 21.059 | 22.238 | 23.011 | 25.264 |
| 0 | 25.645 | 26.825 | 28.396 | 30.648 |
| Segments(R,S) R 10 S 9 b(s,r) | | | | |
| 3 | 19.183 | 20.810 | 22.801 | 25.445 |
| 2 | 22.000 | 23.627 | 26.108 | 28.751 |
| 1 | 25.264 | 27.516 | 26.529 | 31.654 |
| 0 | 30.648 | 32.901 | 35.531 | 40.656 |
| Segments(R,S) R 10 S 10 b(s,r) | | | | |
| 3 | 25.445 | 28.088 | 31.242 | 36.249 |
| 2 | 28.751 | 31.394 | 36.089 | 41.096 |
| 1 | 31.654 | 36.778 | 0.000 | 0.000 |
| 0 | 40.656 | 45.781 | 0.000 | 0.000 |

TABLE IV

Coefficients of the bivariate polynomials according to the Bezier method for the first embodiment

| r | s: 3 | 2 | 1 | 0 |
|---|---|---|---|---|
| FIRST LENS SURFACE | | | | |
| Segments(R, S) R 1 S 1 | | | | |
| b(s, r), wherein (s, r) are the indices of "b" according to FIG. 5 | | | | |
| 3 | 0.000 | 0.000 | 0.000 | 0.000 |
| 2 | 0.000 | 0.000 | 0.000 | 0.000 |
| 1 | 0.000 | 0.000 | 0.000 | 0.000 |
| 0 | 0.000 | 0.000 | 0.000 | 0.000 |
| SECOND LENS SURFACE | | | | |
| Segments(R, S) R 1 S 1 | | | | |
| b(s, r), wherein (s, r) are the indices of "b" according to FIG. 5 | | | | |
| 3 | −56.222 | −51.668 | −47.117 | −43.157 |
| 2 | −51.668 | −47.115 | −42.167 | −38.207 |
| 1 | −47.117 | −42.167 | −37.461 | −33.853 |
| 0 | −43.157 | −38.207 | −33.853 | −30.245 |
| Segments(R, S) R 1 S 2 b(s, r) | | | | |
| 3 | −43.157 | −39.197 | −35.792 | −32.997 |
| 2 | −38.207 | −34.247 | −31.133 | −28.338 |
| 1 | −33.853 | −30.245 | −26.833 | −24.518 |
| 0 | −30.245 | −26.637 | −23.746 | −21.432 |
| Segments(R, S) R 1 S 3 b(s, r) | | | | |
| 3 | −32.997 | −30.201 | −28.000 | −26.300 |
| 2 | −28.338 | −25.543 | −23.750 | −22.050 |
| 1 | −24.518 | −22.203 | −20.046 | −18.707 |
| 0 | −21.432 | −19.117 | −17.368 | −16.030 |
| Segments (R,S) R 1 S 4 b(s, r) | | | | |
| 3 | −26.300 | −24.600 | −23.396 | −22.604 |
| 2 | −22.050 | −20.350 | −19.437 | −18.646 |
| 1 | −18.707 | −17.368 | −16.207 | −15.596 |
| 0 | −16.030 | −14.691 | −13.761 | −13.149 |
| Segments(R, S) R 1 S 5 b(s, r) | | | | |
| 3 | −22.604 | −21.813 | −21.432 | −21.432 |
| 2 | −18.646 | −17.854 | −17.574 | −17.574 |
| 1 | −15.596 | −14.984 | −14.620 | −14.620 |
| 0 | −13.149 | −12.538 | −12.246 | −12.246 |

TABLE IV-continued

Coefficients of the bivariate polynomials according to the Bezier method for the first embodiment

| r | s = 3 | 2 | 1 | 0 |
|---|---|---|---|---|
| | | Segments(R, S) R 1 S 6 b(s, r) | | |
| 3 | −21.432 | −21.432 | −21.813 | −22.604 |
| 2 | −17.574 | −17.574 | −17.854 | −18.646 |
| 1 | −14.620 | −14.620 | −14.984 | −15.596 |
| 0 | −12.246 | −12.246 | −12.538 | −13.149 |
| | | Segments(R, S) R 1 S 7 b(s, r) | | |
| 3 | −22.604 | −23.396 | −24.600 | −26.300 |
| 2 | −18.646 | −19.437 | −20.350 | −22.050 |
| 1 | −15.596 | −16.207 | −17.368 | −18.707 |
| 0 | −13.149 | −13.761 | −14.691 | −16.030 |
| | | Segments(R, S) R 1 S 8 b(s, r) | | |
| 3 | −26.300 | −28.000 | −30.201 | −32.997 |
| 2 | −22.050 | −23.750 | −25.543 | −28.338 |
| 1 | −18.707 | −20.046 | −22.203 | −24.518 |
| 0 | −16.030 | −17.368 | −19.117 | −21.432 |
| | | Segments(R, S) R 1 S 9 b(s, r) | | |
| 3 | −32.997 | −35.792 | −39.197 | −43.157 |
| 2 | −28.338 | −31.133 | −34.247 | −38.207 |
| 1 | −24.518 | −26.833 | −30.245 | −33.853 |
| 0 | −21.432 | −23.746 | −26.637 | −30.245 |
| | | Segments(R, S) R 1 S 10 b(s, r) | | |
| 3 | −43.157 | −47.117 | −51.668 | −56.222 |
| 2 | −38.207 | −42.167 | −47.115 | −51.668 |
| 1 | −33.853 | −37.461 | −42.167 | −47.117 |
| 0 | −30.245 | −33.853 | −38.207 | −43.157 |
| | | Segments(R, S) R 2 S 1 b(s, r) | | |
| 3 | −43.157 | −38.207 | −33.853 | −30.245 |
| 2 | −39.197 | −34.247 | −30.245 | −26.637 |
| 1 | −35.792 | −31.133 | −26.833 | −23.746 |
| 0 | −32.997 | −28.338 | −24.518 | −21.432 |
| | | Segments(R, S) R 2 S 2 b(s, r) | | |
| 3 | −30.245 | −26.637 | −23.746 | −21.432 |
| 2 | −26.637 | −23.029 | −20.660 | −18.346 |
| 1 | −23.746 | −20.660 | −17.862 | −15.972 |
| 0 | −21.432 | −18.346 | −15.972 | −14.081 |
| | | Segments(R, S) R 2 S 3 b(s, r) | | |
| 3 | −21.432 | −19.117 | −17.368 | −16.030 |
| 2 | −18.346 | −16.031 | −14.691 | −13.352 |
| 1 | −15.972 | −14.081 | −12.413 | −11.322 |
| 0 | −14.081 | −12.190 | −10.777 | −9.687 |
| | | Segments(R, S) R 2 S 4 b(s, r) | | |
| 3 | −16.030 | −14.691 | −13.761 | −13.149 |
| 2 | −13.352 | −12.013 | −11.315 | −10.703 |
| 1 | −11.322 | −10.232 | −9.353 | −8.845 |
| 0 | −9.687 | −8.596 | −7.830 | −7.322 |
| | | Segments(R, S) R 2 S 5 b(s, r) | | |
| 3 | −13.149 | −12.538 | −12.246 | −12.246 |
| 2 | −10.703 | −10.091 | −9.871 | −9.871 |
| 1 | −8.845 | −8.337 | −8.062 | −8.062 |
| 0 | −7.322 | −6.814 | −6.567 | −6.567 |
| | | Segments(R, S) R 2 S 6 b(s, r) | | |
| 3 | −12.246 | −12.246 | −12.538 | −13.149 |
| 2 | −9.871 | −9.871 | −10.091 | −10.703 |
| 1 | −8.062 | −8.062 | −8.337 | −8.845 |
| 0 | −6.567 | −6.567 | −6.814 | −7.322 |
| | | Segments(R, S) R 2 S 7 b(s, r) | | |
| 3 | −13.149 | −13.761 | −14.691 | −16.030 |
| 2 | −10.703 | −11.315 | −12.013 | −13.352 |
| 1 | −8.845 | −9.353 | −10.232 | −11.322 |
| 0 | −7.322 | −7.830 | −8.596 | −9.687 |
| | | Segments(R, S) R 2 S 8 b(s, r) | | |

TABLE IV-continued

Coefficients of the bivariate polynomials according to the Bezier method for the first embodiment

| r | s = 3 | 2 | 1 | 0 |
|---|---|---|---|---|
| 3 | −16.030 | −17.368 | −19.117 | −21.432 |
| 2 | −13.352 | −14.691 | −16.031 | −18.346 |
| 1 | −11.322 | −12.413 | −14.081 | −15.972 |
| 0 | −9.687 | −10.777 | −12.190 | −14.081 |
| | | Segments(R, S) R 2 S 9 b(s, r) | | |
| 3 | −21.432 | −23.746 | −26.637 | −30.245 |
| 2 | −18.346 | −20.660 | −23.029 | −26.637 |
| 1 | −15.972 | −17.862 | −20.660 | −23.746 |
| 0 | −14.081 | −15.972 | −18.346 | −21.432 |
| | | Segments(R, S) R 2 S 10 b(s, r) | | |
| 3 | −30.245 | −33.853 | −38.207 | −43.157 |
| 2 | −26.637 | −30.245 | −34.247 | −39.197 |
| 1 | −23.746 | −26.833 | −31.133 | −35.792 |
| 0 | −21.432 | −24.518 | −28.338 | −32.997 |
| | | Segments(R, S) R 3 S 1 b(s, r) | | |
| 3 | −32.997 | −28.338 | −24.518 | −21.432 |
| 2 | −30.201 | −25.543 | −22.203 | −19.117 |
| 1 | −28.000 | −23.750 | −20.046 | −17.368 |
| 0 | −26.300 | −22.050 | −18.707 | −16.030 |
| | | Segments(R, S) R 3 S 2 b(s, r) | | |
| 3 | −21.432 | −18.346 | −15.972 | −14.081 |
| 2 | −19.117 | −16.031 | −14.081 | −12.190 |
| 1 | −17.368 | −14.691 | −12.413 | −10.777 |
| 0 | −16.030 | −13.352 | −11.322 | −9.687 |
| | | Segments(R, S) R 3 S 3 b(s, r) | | |
| 3 | −14.081 | −12.190 | −10.777 | −9.687 |
| 2 | −12.190 | −10.299 | −9.141 | −8.051 |
| 1 | −10.777 | −9.141 | −7.788 | −6.807 |
| 0 | −9.687 | −8.051 | −6.807 | −5.826 |
| | | Segments(R, S) R 3 S 4 b(s, r) | | |
| 3 | −9.687 | −8.596 | −7.830 | −7.322 |
| 2 | −8.051 | −6.960 | −6.306 | −5.798 |
| 1 | −6.807 | −5.826 | −5.088 | −4.609 |
| 0 | −5.826 | −4.845 | −4.130 | −3.652 |
| | | Segments(R, S) R 3 S 5 b(s, r) | | |
| 3 | −7.322 | −6.814 | −6.567 | −6.567 |
| 2 | −5.798 | −5.291 | −5.072 | −5.072 |
| 1 | −4.609 | −4.130 | −3.892 | −3.892 |
| 0 | −3.652 | −3.173 | −2.933 | −2.933 |
| | | Segments(R, S) R 3 S 6 b(s, r) | | |
| 3 | −6.567 | −6.567 | −6.814 | −7.322 |
| 2 | −5.072 | −5.072 | −5.291 | −5.798 |
| 1 | −3.892 | −3.892 | −4.130 | −4.609 |
| 0 | −2.933 | −2.933 | −3.173 | −3.652 |
| | | Segments(R, S) R 3 S 7 b(s, r) | | |
| 3 | −7.322 | −7.830 | −8.596 | −9.687 |
| 2 | −5.798 | −6.306 | −6.960 | −8.051 |
| 1 | −4.609 | −5.088 | −5.826 | −6.807 |
| 0 | −3.652 | −4.130 | −4.845 | −5.826 |
| | | Segments(R, S) R 3 S 8 b(s, r) | | |
| 3 | −9.687 | −10.777 | −12.190 | −14.081 |
| 2 | −8.051 | −9.141 | −10.299 | −12.190 |
| 1 | −6.807 | −7.788 | −9.141 | −10.777 |
| 0 | −5.826 | −6.807 | −8.051 | −9.687 |
| | | Segments(R, S) R 3 S 9 b(s, r) | | |
| 3 | −14.081 | −15.972 | −18.346 | −21.432 |
| 2 | −12.190 | −14.081 | −16.031 | −19.117 |
| 1 | −10.777 | −12.413 | −14.691 | −17.368 |
| 0 | −9.687 | −11.322 | −13.352 | −16.030 |
| | | Segments(R, S) R 3 S 10 b(s, r) | | |
| 3 | −21.432 | −24.518 | −28.338 | −32.997 |
| 2 | −19.117 | −22.203 | −25.543 | −30.201 |

TABLE IV-continued

Coefficients of the bivariate polynomials according to the Bezier method for the first embodiment

| | s | | | |
|---|---|---|---|---|
| r | 3 | 2 | 1 | 0 |
| 1 | −17.368 | −20.046 | −23.750 | −28.000 |
| 0 | −16.030 | −18.707 | −22.050 | −26.300 |
| | | Segments(R, S) R 4 S 1 | | |
| | | b(s, r) | | |
| 3 | −26.300 | −22.050 | −18.707 | −16.030 |
| 2 | −24.600 | −20.350 | −17.368 | −14.691 |
| 1 | −23.396 | −19.437 | −16.207 | −13.761 |
| 0 | −22.604 | −18.646 | −15.596 | −13.149 |
| | | Segments(R, S) R 4 S 2 | | |
| | | b(s, r) | | |
| 3 | −16.030 | −13.352 | −11.322 | −9.687 |
| 2 | −14.691 | −12.013 | −10.232 | −8.596 |
| 1 | −13.761 | −11.315 | −9.353 | −7.830 |
| 0 | −13.149 | −10.703 | −8.845 | −7.322 |
| | | Segmented (R,S) R 4 S 3 | | |
| | | b(s, r) | | |
| 3 | −9.687 | −8.051 | −6.807 | −5.826 |
| 2 | −8.596 | −6.960 | −5.826 | −4.845 |
| 1 | −7.830 | −6.306 | −5.088 | −4.130 |
| 0 | −7.322 | −5.798 | −4.609 | −3.652 |
| | | Segments(R, S) R 4 S 4 | | |
| | | b(s, r) | | |
| 3 | −5.826 | −4.845 | −4.130 | −3.652 |
| 2 | −4.845 | −3.864 | −3.173 | −2.694 |
| 1 | −4.130 | −3.173 | −2.461 | −1.974 |
| 0 | −3.652 | −2.694 | −1.974 | −1.486 |
| | | Segments(R, S) R 4 S 5 | | |
| | | b(s, r) | | |
| 3 | −3.652 | −3.173 | −2.933 | −2.933 |
| 2 | −2.694 | −2.215 | −1.975 | −1.975 |
| 1 | −1.974 | −1.486 | −1.245 | −1.245 |
| 0 | −1.486 | −0.999 | −0.750 | −0.750 |
| | | Segments(R, S) R 4 S 6 | | |
| | | b(s, r) | | |
| 3 | −2.933 | −2.933 | −3.173 | −3.652 |
| 2 | −1.975 | −1.975 | −2.215 | −2.694 |
| 1 | −1.245 | −1.245 | −1.486 | −1.974 |
| 0 | −0.750 | −0.750 | −0.999 | −1.486 |
| | | Segments(R, S) R 4 S 7 | | |
| | | b(s, r) | | |
| 3 | −3.652 | −4.130 | −4.845 | −5.826 |
| 2 | −2.694 | −3.173 | −3.864 | −4.845 |
| 1 | −1.974 | −2.461 | −3.173 | −4.130 |
| 0 | −1.486 | −1.974 | −2.694 | −3.652 |
| | | Segments(R, S) R 4 S 8 | | |
| | | b(s, r) | | |
| 3 | −5.826 | −6.807 | −8.051 | −9.687 |
| 2 | −4.845 | −5.826 | −6.960 | −8.596 |
| 1 | −4.130 | −5.088 | −6.306 | −7.830 |
| 0 | −3.652 | −4.609 | −5.798 | −7.322 |
| | | Segments(R, S) R 4 S 9 | | |
| | | b(s, r) | | |
| 3 | −9.687 | −11.322 | −13.352 | −16.030 |
| 2 | −8.596 | −10.232 | −12.013 | −14.691 |
| 1 | −7.830 | −9.353 | −11.315 | −13.761 |
| 0 | −7.322 | −8.845 | −10.703 | −13.149 |
| | | Segments(R, S) R 4 S 10 | | |
| | | b(s, r) | | |
| 3 | −16.030 | −18.707 | −22.050 | −26.300 |
| 2 | −14.691 | −17.368 | −20.350 | −24.600 |
| 1 | −13.761 | −16.207 | −19.437 | −23.396 |
| 0 | −13.149 | −15.596 | −18.646 | −22.604 |
| | | Segments(R, S) R 5 S 1 | | |
| | | b(s, r) | | |
| 3 | −22.604 | −18.646 | −15.596 | −13.149 |
| 2 | −21.813 | −17.854 | −14.984 | −12.538 |
| 1 | −21.432 | −17.574 | −14.620 | −12.246 |
| 0 | −21.432 | −17.574 | −14.620 | −12.246 |
| | | Segments(R, S) R 5 S 2 | | |
| | | b(s, r) | | |
| 3 | −13.149 | −10.703 | −8.845 | −7.322 |
| 2 | −12.538 | −10.091 | −8.337 | −6.814 |
| 1 | −12.246 | −9.871 | −8.062 | −6.567 |
| 0 | −12.246 | −9.871 | −8.062 | −6.567 |

TABLE IV-continued

Coefficients of the bivariate polynomials according to the Bezier method for the first embodiment

| | s | | | |
|---|---|---|---|---|
| r | 3 | 2 | 1 | 0 |
| | | Segments(R, S) R 5 S 3 | | |
| | | b(s, r) | | |
| 3 | −7.322 | −5.798 | −4.609 | −3.652 |
| 2 | −6.814 | −5.291 | −4.130 | −3.173 |
| 1 | −6.567 | −5.072 | −3.892 | −2.933 |
| 0 | −6.567 | −5.072 | −3.892 | −2.933 |
| | | Segments(R, S) R 5 S 4 | | |
| | | b(s, r) | | |
| 3 | −3.652 | −2.694 | −1.974 | −1.486 |
| 2 | −3.173 | −2.215 | −1.486 | −0.999 |
| 1 | −2.933 | −1.975 | −1.245 | −0.750 |
| 0 | −2.933 | −1.975 | −1.245 | −0.750 |
| | | Segments(R, S) R 5 S 5 | | |
| | | b(s, r) | | |
| 3 | −1.486 | −0.999 | −0.750 | −0.750 |
| 2 | −0.999 | −0.512 | −0.255 | −0.255 |
| 1 | −0.750 | −0.255 | 0.000 | 0.000 |
| 0 | −0.750 | −0.255 | 0.000 | 0.000 |
| | | Segments(R, S) R 5 S 6 | | |
| | | b(s, r) | | |
| 3 | −0.750 | −0.750 | −0.999 | −1.486 |
| 2 | −0.255 | −0.255 | −0.512 | −0.999 |
| 1 | 0.000 | 0.000 | −0.255 | −0.750 |
| 0 | 0.000 | 0.000 | −0.255 | −0.750 |
| | | Segments(R, S) R 5 S 7 | | |
| | | b(s, r) | | |
| 3 | −1.486 | −1.974 | −2.694 | −3.652 |
| 2 | −0.999 | −1.486 | −2.215 | −3.173 |
| 1 | −0.750 | −1.245 | −1.975 | −2.933 |
| 0 | −0.750 | −1.245 | −1.975 | −2.933 |
| | | Segments(R, S) R 5 S 8 | | |
| | | b(s, r) | | |
| 3 | −3.652 | −4.609 | −5.798 | −7.322 |
| 2 | −3.173 | −4.130 | −5.291 | −6.814 |
| 1 | −2.933 | −3.892 | −5.072 | −6.567 |
| 0 | −2.933 | −3.892 | −5.072 | −6.567 |
| | | Segments(R, S) R 5 S 9 | | |
| | | b(s, r) | | |
| 3 | −7.322 | −8.845 | −10.703 | −13.149 |
| 2 | −6.814 | −8.337 | −10.091 | −12.538 |
| 1 | −6.567 | −8.062 | −9.871 | −12.246 |
| 0 | −6.567 | −8.062 | −9.871 | −12.246 |
| | | Segments(R, S) R 5 S 10 | | |
| | | b(s, r) | | |
| 3 | −13.149 | −15.596 | −18.646 | −22.604 |
| 2 | −12.538 | −14.984 | −17.854 | −21.813 |
| 1 | −12.246 | −14.620 | −17.574 | −21.432 |
| 0 | −12.246 | −14.620 | −17.574 | −21.432 |
| | | Segments(R, S) R 6 S 1 | | |
| | | b(s, r) | | |
| 3 | −21.432 | −17.574 | −14.620 | −12.246 |
| 2 | −21.432 | −17.574 | −14.620 | −12.246 |
| 1 | −21.813 | −17.854 | −14.984 | −12.538 |
| 0 | −22.604 | −18.646 | −15.596 | −13.149 |
| | | Segments(R, S) R 6 S 2 | | |
| | | b(s, r) | | |
| 3 | −12.246 | −9.871 | −8.062 | −6.567 |
| 2 | −12.246 | −9.871 | −8.062 | −6.567 |
| 1 | −12.538 | −10.091 | −8.337 | −6.814 |
| 0 | −13.149 | −10.703 | −8.845 | −7.322 |
| | | Segments(R, S) R 6 S 3 | | |
| | | b(s, r) | | |
| 3 | −6.567 | −5.072 | −3.892 | −2.933 |
| 2 | −6.567 | −5.072 | −3.892 | −2.933 |
| 1 | −6.814 | −5.291 | −4.130 | −3.173 |
| 0 | −7.322 | −5.798 | −4.609 | −3.652 |
| | | Segments(R, S) R 6 S 4 | | |
| | | b(s, r) | | |
| 3 | −2.933 | −1.975 | −1.245 | −0.750 |
| 2 | −2.933 | −1.975 | −1.245 | −0.750 |
| 1 | −3.173 | −2.215 | −1.486 | −0.999 |
| 0 | −3.652 | −2.694 | −1.974 | −1.486 |
| | | Segments(R, S) R 6 S 5 | | |
| | | b(s, r) | | |

TABLE IV-continued

| Coefficients of the bivariate polynomials according to the Bezier method for the first embodiment | | | | |
|---|---|---|---|---|
| | s | | | |
| r | 3 | 2 | 1 | 0 |
| 3 | −0.750 | −0.255 | 0.000 | 0.000 |
| 2 | −0.750 | −0.255 | 0.000 | 0.000 |
| 1 | −0.999 | −0.512 | −0.255 | −0.255 |
| 0 | −1.486 | −0.999 | −0.750 | −0.750 |
| | | Segments(R, S) R 6 S 6 | | |
| | | b(s, r) | | |
| 3 | 0.000 | 0.000 | −0.255 | −0.750 |
| 2 | 0.000 | 0.000 | −0.255 | −0.750 |
| 1 | −0.255 | −0.255 | −0.512 | −0.999 |
| 0 | −0.750 | −0.750 | −0.999 | −1.486 |
| | | Segments(R, S) R 6 S 7 | | |
| | | b(s, r) | | |
| 3 | −0.750 | −1.245 | −1.975 | −2.933 |
| 2 | −0.750 | −1.245 | −1.975 | −2.933 |
| 1 | −0.999 | −1.486 | −2.215 | −3.173 |
| 0 | −1.486 | −1.974 | −2.694 | −3.652 |
| | | Segments(R, S) R 6 S 8 | | |
| | | b(s, r) | | |
| 3 | −2.933 | −3.892 | −5.072 | −6.567 |
| 2 | −2.933 | −3.892 | −5.072 | −6.567 |
| 1 | −3.173 | −4.130 | −5.291 | −6.814 |
| 0 | −3.652 | −4.609 | −5.798 | −7.322 |
| | | Segments(R, S) R 6 S 9 | | |
| | | b(s, r) | | |
| 3 | −6.567 | −8.062 | −9.871 | −12.246 |
| 2 | −6.567 | −8.062 | −9.871 | −12.246 |
| 1 | −6.814 | −8.337 | −10.091 | −12.538 |
| 0 | −7.322 | −8.845 | −10.703 | −13.149 |
| | | Segments(R, S) R 6 S 10 | | |
| | | b(s, r) | | |
| 3 | −12.246 | −14.620 | −17.574 | −21.432 |
| 2 | −12.246 | −14.620 | −17.574 | −21.432 |
| 1 | −12.538 | −14.984 | −17.854 | −21.813 |
| 0 | −13.149 | −15.596 | −18.646 | −22.604 |
| | | Segments(R, S) R 7 S 1 | | |
| | | b(s, r) | | |
| 3 | −22.604 | −18.646 | −15.596 | −13.149 |
| 2 | −23.396 | −19.437 | −16.207 | −13.761 |
| 1 | −24.600 | −20.350 | −17.368 | −14.691 |
| 0 | −26.300 | −22.050 | −18.707 | −16.030 |
| | | Segments(R, S) R 7 S 2 | | |
| | | b(s, r) | | |
| 3 | −13.149 | −10.703 | −8.845 | −7.322 |
| 2 | −13.761 | −11.315 | −9.353 | −7.830 |
| 1 | −14.691 | −12.013 | −10.322 | −8.596 |
| 0 | −16.030 | −13.352 | −11.322 | −9.687 |
| | | Segments(R, S) R 7 S 3 | | |
| | | b(s, r) | | |
| 3 | −7.322 | −5.798 | −4.609 | −3.652 |
| 2 | −7.830 | −6.306 | −5.088 | −4.130 |
| 1 | −8.596 | −6.960 | −5.826 | −4.845 |
| 0 | −9.687 | −8.051 | −6.807 | −5.826 |
| | | Segments(R, S) R 7 S 4 | | |
| | | b(s, r) | | |
| 3 | −3.652 | −2.694 | −1.974 | −1.486 |
| 2 | −4.130 | −3.173 | −2.461 | −1.974 |
| 1 | −4.845 | −3.864 | −3.173 | −2.694 |
| 0 | −5.826 | −4.845 | −4.130 | −3.652 |
| | | Segments(R, S) R 7 S 5 | | |
| | | b(s, r) | | |
| 3 | −1.486 | −0.999 | −0.750 | −0.750 |
| 2 | −1.974 | −1.486 | −1.245 | −1.245 |
| 1 | −2.694 | −2.215 | −1.975 | −1.975 |
| 0 | −3.652 | −3.173 | −2.933 | −2.933 |
| | | Segments(R, S) R 7 S 6 | | |
| | | b(s, r) | | |
| 3 | −0.750 | −0.750 | −0.999 | −1.486 |
| 2 | −1.245 | −1.245 | −1.486 | −1.974 |
| 1 | −1.975 | −1.975 | −2.215 | −2.694 |
| 0 | −2.933 | −2.933 | −3.173 | −3.652 |
| | | Segments(R, S) R 7 S 7 | | |
| | | b(s, r) | | |
| 3 | −1.486 | −1.974 | −2.694 | −3.652 |
| 2 | −1.974 | −2.461 | −3.173 | −4.130 |

TABLE IV-continued

| Coefficients of the bivariate polynomials according to the Bezier method for the first embodiment | | | | |
|---|---|---|---|---|
| | s | | | |
| r | 3 | 2 | 1 | 0 |
| 1 | −2.694 | −3.173 | −3.864 | −4.845 |
| 0 | −3.652 | −4.130 | −4.845 | −5.826 |
| | | Segments(R, S) R 7 S 8 | | |
| | | b(s, r) | | |
| 3 | −3.652 | −4.609 | −5.798 | −7.322 |
| 2 | −4.130 | −5.088 | −6.306 | −7.830 |
| 1 | −4.845 | −5.826 | −6.960 | −8.596 |
| 0 | −5.826 | −6.807 | −8.051 | −9.687 |
| | | Segments(R, S) R 7 S 9 | | |
| | | b(s, r) | | |
| 3 | −7.322 | −8.845 | −10.703 | −13.149 |
| 2 | −7.830 | −9.353 | −11.315 | −13.761 |
| 1 | −8.596 | −10.232 | −12.013 | −14.691 |
| 0 | −9.687 | −11.322 | −13.352 | −16.030 |
| | | Segments(R, S) R 7 S 10 | | |
| | | b(s, r) | | |
| 3 | −13.149 | −15.596 | −18.646 | −22.604 |
| 2 | −13.761 | −16.207 | −19.437 | −23.396 |
| 1 | −14.691 | −17.368 | −20.350 | −24.600 |
| 0 | −16.030 | −18.707 | −22.050 | −26.300 |
| | | Segments(R, S) R 8 S 1 | | |
| | | b(s, r) | | |
| 3 | −26.300 | −22.050 | −18.707 | −16.030 |
| 2 | −28.000 | −23.750 | −20.046 | −17.368 |
| 1 | −30.201 | −25.543 | −22.203 | −19.117 |
| 0 | −32.997 | −28.338 | −24.518 | −21.432 |
| | | Segments(R, S) R 8 S 2 | | |
| | | b(s, r) | | |
| 3 | −16.030 | −13.352 | −11.322 | −9.687 |
| 2 | −17.368 | −14.691 | −12.413 | −10.777 |
| 1 | −19.117 | −16.031 | −14.081 | −12.190 |
| 0 | −21.432 | −18.346 | −15.972 | −14.081 |
| | | Segments(R, S) R 8 S 3 | | |
| | | b(s, r) | | |
| 3 | −9.687 | −8.051 | −6.807 | −5.826 |
| 2 | −10.777 | −9.141 | −7.788 | −6.807 |
| 1 | −12.190 | −10.299 | −9.141 | −8.051 |
| 0 | −14.081 | −12.190 | −10.777 | −9.687 |
| | | Segments(R, S) R 8 S 4 | | |
| | | b(s, r) | | |
| 3 | −5.826 | −4.845 | −4.130 | −3.652 |
| 2 | −6.807 | −5.826 | −5.088 | −4.609 |
| 1 | −8.051 | −6.960 | −6.306 | −5.798 |
| 0 | −9.687 | −8.596 | −7.830 | −7.322 |
| | | Segments(R, S) R 8 S 5 | | |
| | | b(s, r) | | |
| 3 | −3.652 | −3.173 | −2.933 | −2.933 |
| 2 | −4.609 | −4.130 | −3.892 | −3.892 |
| 1 | −5.798 | −5.291 | −5.072 | −5.072 |
| 0 | −7.322 | −6.814 | −6.567 | −6.567 |
| | | Segments(R, S) R 8 S 6 | | |
| | | b(s, r) | | |
| 3 | −2.933 | −2.933 | −3.173 | −3.652 |
| 2 | −3.892 | −3.892 | −4.130 | −4.609 |
| 1 | −5.072 | −5.072 | −5.291 | −5.798 |
| 0 | −6.567 | −6.567 | −6.814 | −7.322 |
| | | Segments(R, S) R 8 S 7 | | |
| | | b(s, r) | | |
| 3 | −3.652 | −4.130 | −4.845 | −5.826 |
| 2 | −4.609 | −5.088 | −5.826 | −6.807 |
| 1 | −5.798 | −6.306 | −6.960 | −8.051 |
| 0 | −7.322 | −7.830 | −8.596 | −9.687 |
| | | Segments(R, S) R 8 S 8 | | |
| | | b(s, r) | | |
| 3 | −5.826 | −6.807 | −8.051 | −9.687 |
| 2 | −6.807 | −7.788 | −9.141 | −10.777 |
| 1 | −8.051 | −9.141 | −10.299 | −12.190 |
| 0 | −9.687 | −10.777 | −12.190 | −14.081 |
| | | Segments(R, S) R 8 S 9 | | |
| | | b(s, r) | | |
| 3 | −9.687 | −11.322 | −13.352 | −16.030 |
| 2 | −10.777 | −12.413 | −14.691 | −17.368 |
| 1 | −12.190 | −14.081 | −16.031 | −19.117 |
| 0 | −14.081 | −15.972 | −18.346 | −21.432 |

TABLE IV-continued

Coefficients of the bivanate polynomials according to the Bezier method for the first embodiment

| | s | | | |
|---|---|---|---|---|
| r | 3 | 2 | 1 | 0 |
| | | Segments(R, S) R 8 S 10 b(s, r) | | |
| 3 | −16.030 | −18.707 | −22.050 | −26.300 |
| 2 | −17.368 | −20.046 | −23.750 | −28.000 |
| 1 | −19.117 | −22.203 | −25.543 | −30.201 |
| 0 | −21.432 | −24.518 | −28.338 | −32.997 |
| | | Segments(R, S) R 9 S 1 b(s, r) | | |
| 3 | −32.997 | −28.338 | −24.518 | −21.432 |
| 2 | −35.792 | −31.133 | −26.833 | −23.746 |
| 1 | −39.197 | −34.247 | −30.245 | −26.637 |
| 0 | −43.157 | −38.207 | −33.853 | −30.245 |
| | | Segments(R, S) R 9 S 2 b (s,r) | | |
| 3 | −21.432 | −18.346 | −15.972 | −14.081 |
| 2 | −23.746 | −20.660 | −17.862 | −15.972 |
| 1 | −26.637 | −23.029 | −20.660 | −18.346 |
| 0 | −30.245 | −26.637 | −23.746 | −21.432 |
| | | Segments(R, S) R 9 S 3 b(s, r) | | |
| 3 | −14.081 | −12.190 | −10.777 | −9.687 |
| 2 | −15.972 | −14.081 | −12.413 | −11.322 |
| 1 | −18.346 | −16.031 | −14.691 | −13.352 |
| 0 | −21.432 | −19.117 | −17.368 | −16.030 |
| | | Segments (R, S) R 9 S 4 b(s, r) | | |
| 3 | −9.687 | −8.596 | −7.830 | −7.322 |
| 2 | −11.322 | −10.232 | −9.353 | −8.845 |
| | −13.352 | −12.013 | −11.315 | −10.703 |
| 0 | −16.030 | −14.691 | −13.761 | −13.149 |
| | | Segments(R, S) R 9 S 5 b(s, r) | | |
| 3 | −7.322 | −6.814 | −6.567 | −6.567 |
| 2 | −8.845 | −8.337 | −8.062 | −8.062 |
| 1 | −10.703 | −10.091 | −9.871 | −9.871 |
| 0 | −13.149 | −12.538 | −12.246 | −12.246 |
| | | Segments(R, S) R 9 S 6 b(s, r) | | |
| 3 | −6.567 | −6.567 | −6.814 | −7.322 |
| 2 | −8.062 | −8.062 | −8.337 | −8.845 |
| 1 | −9.871 | −9.871 | −10.091 | −10.703 |
| 0 | −12.246 | −12.246 | −12.538 | −13.149 |
| | | Segments(R, S) R 9 S 7 b(s, r) | | |
| 3 | −7.322 | −7.830 | −8.596 | −9.687 |
| 2 | −8.845 | −9.353 | −10.232 | −11.322 |
| 1 | −10.703 | −11.315 | −12.013 | −13.352 |
| 0 | −13.149 | −13.761 | −14.691 | −16.030 |
| | | Segments(R, S) R 9 S 8 b(s, r) | | |
| 3 | −9.687 | −10.777 | −12.190 | −14.081 |
| 2 | −11.322 | −12.413 | −14.081 | −15.972 |
| 1 | −13.352 | −14.691 | −16.031 | −18.346 |
| 0 | −16.030 | −17.368 | −19.117 | −21.432 |
| | | Segments(R, S) R 9 S 9 b(s, r) | | |
| 3 | −14.081 | −15.972 | −18.346 | −21.432 |
| 2 | −15.972 | −17.862 | −20.660 | −23.746 |
| 1 | −18.346 | −20.660 | −23.029 | −26.637 |
| 0 | −21.432 | −23.746 | −26.637 | −30.245 |
| | | Segments(R, S) R 9 S 10 b(s, r) | | |
| 3 | −21.432 | −24.518 | −28.338 | −32.997 |
| 2 | −23.746 | −26.833 | −31.133 | −35.792 |
| 1 | −26.637 | −30.245 | −34.247 | −39.197 |
| 0 | −30.245 | −33.853 | −38.207 | −43.157 |
| | | Segments(R, S) R 10 S 1 b(s, r) | | |
| 3 | −43.157 | −38.207 | −33.853 | −30.245 |
| 2 | −47.117 | −42.167 | −37.461 | −33.853 |
| 1 | −51.668 | −47.115 | −42.167 | −38.207 |
| 0 | −56.222 | −51.668 | −47.117 | −43.157 |
| | | Segments(R, S) R 10 S 2 b(s, r) | | |

TABLE IV-continued

Coefficients of the bivariate polynomials according to the Bezier method for the first embodiment

| | s | | | |
|---|---|---|---|---|
| r | 3 | 2 | 1 | 0 |
| 3 | −30.245 | −26.637 | −23.746 | −21.432 |
| 2 | −33.853 | −30.245 | −26.833 | −24.518 |
| 1 | −38.207 | −34.247 | −31.133 | −28.338 |
| 0 | −43.157 | −39.197 | −35.792 | −32.997 |
| | | Segments(R, S) R 10 S 3 b(s, r) | | |
| 3 | −21.432 | −19.117 | −17.368 | −16.030 |
| 2 | −24.518 | −22.203 | −20.046 | −18.707 |
| 1 | −28.338 | −25.543 | −23.750 | −22.050 |
| 0 | −32.997 | −30.201 | −28.000 | −26.300 |
| | | Segments(R, S) R 10 S 4 b(s, r) | | |
| 3 | −16.030 | −14.691 | −13.761 | −13.149 |
| 2 | −18.707 | −17.368 | −16.207 | −15.596 |
| 1 | −22.050 | −20.350 | −19.437 | −18.646 |
| 0 | −26.300 | −24.600 | −23.396 | −22.604 |
| | | Segments(R, S) R 10 S 5 b(s, r) | | |
| 3 | −13.149 | −12.538 | −12.246 | −12.246 |
| 2 | −15.596 | −14.984 | −14.620 | −14.620 |
| 1 | −18.646 | −17.854 | −17.574 | −17.574 |
| 0 | −22.604 | −21.813 | −21.432 | −21.432 |
| | | Segments(R, S) R 10 S 6 b(s, r) | | |
| 3 | −12.246 | −12.246 | −12.538 | −13.149 |
| 2 | −14.620 | −14.620 | −14.984 | −15.596 |
| 1 | −17.574 | −17.574 | −17.854 | −18.646 |
| 0 | −21.432 | −21.432 | −21.813 | −22.604 |
| | | Segments(R, S) R 10 S 7 b(s, r) | | |
| 3 | −13.149 | −13.761 | −14.691 | −16.030 |
| 2 | −15.596 | −16.207 | −17.368 | −18.707 |
| 1 | −18.646 | −19.437 | −20.350 | −22.050 |
| 0 | −22.604 | −23.396 | −24.600 | −26.300 |
| | | Segments(R, S) R 10 S 8 b(s, r) | | |
| 3 | −16.030 | −17.368 | −19.117 | −21.432 |
| 2 | −18.707 | −20.046 | −22.203 | −24.518 |
| 1 | −22.050 | −23.750 | −25.543 | −28.338 |
| 0 | −26.300 | −28.000 | −30.201 | −32.997 |
| | | Segments(R, S) R 10 S 9 b(s, r) | | |
| 3 | −21.432 | −23.746 | −26.637 | −30.245 |
| 2 | −24.518 | −26.833 | −30.245 | −33.853 |
| 1 | −28.338 | −31.133 | −34.247 | −38.207 |
| 0 | −32.997 | −35.792 | −39.197 | −43.157 |
| | | Segments(R, S) R 10 S 10 b(s, r) | | |
| 3 | −30.245 | −33.853 | −38.207 | −43.157 |
| 2 | −33.853 | −37.461 | −42.167 | −47.117 |
| 1 | −38.207 | −42.167 | −47.115 | −51.668 |
| 0 | −43.157 | −47.117 | −51.668 | −56.222 |

What is claimed is:

1. A vehicular headlight comprising:

an optically effective arrangement having one reflective surface, a light source related to an optical axis which extends in alignment with the optically effective arrangement, characterized in that said reflective surface shows axial asymmetry over its entire axial length, said surface having a shape defined by a mathematical expression that is continuous and that has continuous first and second derivatives everywhere on said surface and such that the beam of light reflected by said reflective surface distributes the light of said light source according to the distribution of the light pattern desired by optimally utilizing the light emitted by the light source.

2. A vehicular headlight comprising:

an optically effective arrangement having one reflective surface, a light source related to an optical axis which extends in alignment with the optically effective arrangement, characterized in that said reflective surface shows axial asymmetry over its entire axial length such that there is no symmetry about any plane containing the axis, said surface having a mathematically continuous shape such that the beam of light reflected by said reflective surface distributes the light of said light source according to the distribution of the light pattern desired by optimally utilizing the light emitted by the light source.

3. A vehicular headlight according to claim 1 or 2, characterized by an optical element arranged in the path of the light beam reflected by said reflective surface, said optical element having an optically effective surface which together with said reflective surface forms said optically effective arrangement.

4. A vehicular headlight according to claim 1 or 2, characterized in that said continuous surface satisfies one single mathematical formula.

5. A vehicular headlight according to claim 4, characterized in that the optically effective surface is designed according to the following formula:

$$X = \frac{\frac{rho^2}{R(phi)}}{1 + \sqrt{1 - (K(phi) + 1) \cdot \frac{rho^2}{R(phi)^2}}} + \sum_{n=0}^{n=ne} AK_n(phi) \cdot rho^n,$$

wherein $$R(phi) = \sum_{m=0}^{m=me} [Rc_m \cdot \cos(m \cdot phi) + Rs_m \cdot \sin(m \cdot phi)],$$

$$K(phi) = \sum_{i=0}^{i=ie} [Kc_i \cdot \cos(i \cdot phi) + Ks_i \cdot \sin(i \cdot phi)],$$

$$AK_n(phi) = \sum_{k=0}^{k=ke} [AKc_{nk} \cdot \cos(k \cdot phi) + AKs_{nk} \cdot \sin(k \cdot phi)]$$

and wherein

X represents a linear cylindrical coordinate of the headlight axis which extends substantially in the direction of the light beam produced by the optically effective surface, rho is the radius vector of said cylindrical coordinates, phi represents the polar angle of said cylindrical coordinates of the loci, n represents integers from 0 through 50, preferably through 10, m, i and k represents integers from 0 through at least 3, preferably through 20.

R(phi) represents a coefficient which depends on phi and defines the limit value of the radii of curvature of the conic part of the surface at the apex with axial planes extending through the headlight axis when X=0, K(phi) represents a conic section coefficient as a function of phi, $AK_n$(phi) represents one of ne+1 different aspheric coefficients as functions of phi, $Rc_m$ and $Rs_m$ each represent one of me+1, and $Kc_i$ and $Ks_i$ each represent one of ie+1 different constant parameters, $AKc_{nk}$ and $AKs_{nk}$ each represents one of (ne+1).-(ke+1) different constant parameters.

6. A vehicular headlight according to claim 1 or 2, characterized in that said continuous surface is formulated by a mathematical representation having mathematical properties such that mathematical manipulation of local regions does not influence optical properties of other regions.

7. A vehicular headlight according to claim 6, characterized in that said continuous surface is partitioned into quadrangular segments by intersection with two families of parallel planes, the planes of each family being parallel to said optical axis with the planes of the other of said families, said surface segments so delineated being defined by bivariate polynomials constrained so that adjacent segments are joined to form a continuous surface such that said mathematically continuous surface has at least two continuous derivatives everywhere, coefficients of said bivariate polynomials being determined by values of said polynomials at the corners of said segments and by said constraints on joining of adjacent segments.

* * * * *